US010690301B2

(12) United States Patent
Clark et al.

(10) Patent No.: US 10,690,301 B2
(45) Date of Patent: Jun. 23, 2020

(54) LIGHTING FIXTURE

(71) Applicant: Hubbell Incorporated, Shelton, CT (US)

(72) Inventors: Adam J. Clark, Bradenton, FL (US); Perry Romano, Bradenton, FL (US); Michael D. Toth, Miami Beach, FL (US)

(73) Assignee: Hubbell Incorporated, Shelton, CT (US)

( * ) Notice: Subject to any disclaimer, the term of this patent is extended or adjusted under 35 U.S.C. 154(b) by 172 days.

(21) Appl. No.: 15/493,602

(22) Filed: Apr. 21, 2017

(65) Prior Publication Data

US 2017/0307149 A1 Oct. 26, 2017

Related U.S. Application Data

(60) Provisional application No. 62/326,209, filed on Apr. 22, 2016.

(51) Int. Cl.
*F21S 2/00* (2016.01)
*F21S 8/08* (2006.01)
(Continued)

(52) U.S. Cl.
CPC .............. *F21S 2/005* (2013.01); *F21S 8/003* (2013.01); *F21S 8/061* (2013.01); *F21S 8/088* (2013.01);
(Continued)

(58) Field of Classification Search
CPC ............ H05B 37/0272; H05B 37/0227; H05B 47/105; H05B 47/19; F21V 23/0492; F21V 23/0042; F21V 23/045; F21V 23/0457; F21V 17/10; F21V 21/30; F21V 21/15; F21V 29/74; F21V 29/745; F21V 29/75;
(Continued)

(56) References Cited

U.S. PATENT DOCUMENTS 4,339,789 A  7/1982 Husby et al.
5,618,099 A  4/1997 Brubacher
(Continued)

FOREIGN PATENT DOCUMENTS

EP  2327930  6/2011
JP  H04246377  9/1992
WO  WO97/045692  12/1997

OTHER PUBLICATIONS

PCT International Search Report for corresponding PCT Application No. PCT/US2017/28731, dated Sep. 1, 2017—4 pages.
(Continued)

*Primary Examiner* — Erin Kryukova
(74) *Attorney, Agent, or Firm* — Michael Best & Friedrich, LLP

(57) ABSTRACT

Lighting fixtures are provided. In one example implementation, the lighting fixture can include a housing portion and one or more modular lighting components mechanically coupled to the housing portion. Each modular lighting component can include a lighting assembly (e.g., an LED lighting assembly) and a heat sink portion. The one or more modular lighting components can be selectively removable from the housing portion to configure the lighting fixture for a plurality of different lighting configurations.

17 Claims, 22 Drawing Sheets

(51) Int. Cl.
| | |
|---|---|
| *F21S 8/06* | (2006.01) |
| *H05B 47/19* | (2020.01) |
| *H05B 47/105* | (2020.01) |
| *F21V 29/76* | (2015.01) |
| *F21S 8/00* | (2006.01) |
| *F21V 17/10* | (2006.01) |
| *F21V 21/15* | (2006.01) |
| *F21V 23/04* | (2006.01) |
| *F21Y 105/16* | (2016.01) |
| *F21W 131/10* | (2006.01) |
| *F21V 21/30* | (2006.01) |
| *F21Y 113/00* | (2016.01) |
| *H05B 47/16* | (2020.01) |
| *F21Y 115/10* | (2016.01) |
| *F21V 5/00* | (2018.01) |
| *F21V 23/00* | (2015.01) |

(52) U.S. Cl.
CPC .............. *F21V 17/10* (2013.01); *F21V 21/15* (2013.01); *F21V 29/76* (2015.01); *H05B 47/105* (2020.01); *H05B 47/19* (2020.01); *F21V 5/007* (2013.01); *F21V 21/30* (2013.01); *F21V 23/003* (2013.01); *F21V 23/045* (2013.01); *F21V 23/0492* (2013.01); *F21W 2131/10* (2013.01); *F21Y 2105/16* (2016.08); *F21Y 2113/00* (2013.01); *F21Y 2115/10* (2016.08); *H05B 47/16* (2020.01); *Y02B 20/42* (2013.01)

(58) Field of Classification Search
CPC ...... F21V 29/76; F21V 29/763; F21V 29/767; F21V 29/77; F21V 29/773; F21V 29/777; F21V 2113/00; F21S 2/005; F21S 8/085; F21S 8/088; F21S 8/061; F21S 8/003; F21W 2131/105; F21W 2131/10
See application file for complete search history.

(56) References Cited

U.S. PATENT DOCUMENTS

| | | | |
|---|---|---|---|
| 6,255,787 | B1 | 7/2001 | Belleveau |
| 6,512,887 | B2 | 1/2003 | Inoue et al. |
| 6,715,904 | B2 | 4/2004 | Naughton |
| 7,188,978 | B2 | 3/2007 | Sharrah et al. |
| 7,810,968 | B1 * | 10/2010 | Walker .................... F21V 21/30 |
| | | | 362/431 |
| 8,104,925 | B2 | 1/2012 | Gordin |
| 8,230,690 | B1 | 7/2012 | Salessi |
| 8,317,363 | B2 * | 11/2012 | Zheng ..................... F21S 8/033 |
| | | | 362/231 |
| 8,794,802 | B2 * | 8/2014 | Wu ....................... F21V 15/013 |
| | | | 362/362 |
| 9,964,267 | B1 * | 5/2018 | Van Ee .................. F21S 8/086 |
| 10,041,641 | B2 * | 8/2018 | Kim ........................ F21V 29/67 |
| 2002/0009694 | A1 | 1/2002 | Rosa |
| 2009/0237927 | A1 * | 9/2009 | Zheng ..................... F21S 2/005 |
| | | | 362/235 |
| 2009/0237931 | A1 * | 9/2009 | Liu .............................. 362/240 |
| 2010/0176732 | A1 * | 7/2010 | Schenk ............... H05B 33/0803 |
| | | | 315/312 |
| 2010/0193336 | A1 * | 8/2010 | Walton .................... F21V 21/36 |
| | | | 200/61.52 |
| 2010/0259931 | A1 * | 10/2010 | Chemel .................. F21V 17/02 |
| | | | 362/249.02 |
| 2011/0194281 | A1 * | 8/2011 | Josefowicz ............. F21S 8/086 |
| | | | 362/235 |
| 2011/0219650 | A1 * | 9/2011 | Wright .................... F21S 2/005 |
| | | | 40/559 |
| 2011/0279038 | A1 | 11/2011 | Quirion et al. |
| 2012/0188766 | A1 * | 7/2012 | Lu ........................ F21V 29/2212 |
| | | | 362/249.02 |
| 2013/0088864 | A1 * | 4/2013 | Verdes .................. F21V 29/004 |
| | | | 362/235 |
| 2013/0148340 | A1 * | 6/2013 | Shen ....................... F21S 8/086 |
| | | | 362/184 |
| 2013/0268246 | A1 | 10/2013 | Gordin |
| 2014/0001972 | A1 | 1/2014 | Harris et al. |
| 2014/0217906 | A1 * | 8/2014 | Vo ....................... H05B 37/0272 |
| | | | 315/155 |
| 2015/0069916 | A1 * | 3/2015 | Fleming ............... H05B 37/029 |
| | | | 315/131 |
| 2015/0300624 | A1 * | 10/2015 | Favarolo .................. F21S 8/06 |
| | | | 362/373 |
| 2017/0184288 | A1 * | 6/2017 | Owens ..................... F21V 21/15 |
| 2017/0205061 | A1 * | 7/2017 | Broers ............... H05B 37/0227 |
| 2017/0215256 | A1 * | 7/2017 | Abbattista .......... H05B 37/0263 |
| 2017/0219188 | A1 * | 8/2017 | Veloskey ................ F21V 19/02 |

OTHER PUBLICATIONS

PCT International Preliminary Report on Patentability for corresponding PCT Application No. PCT/US2017/28731, dated Oct. 23, 2018—8 pages.

* cited by examiner

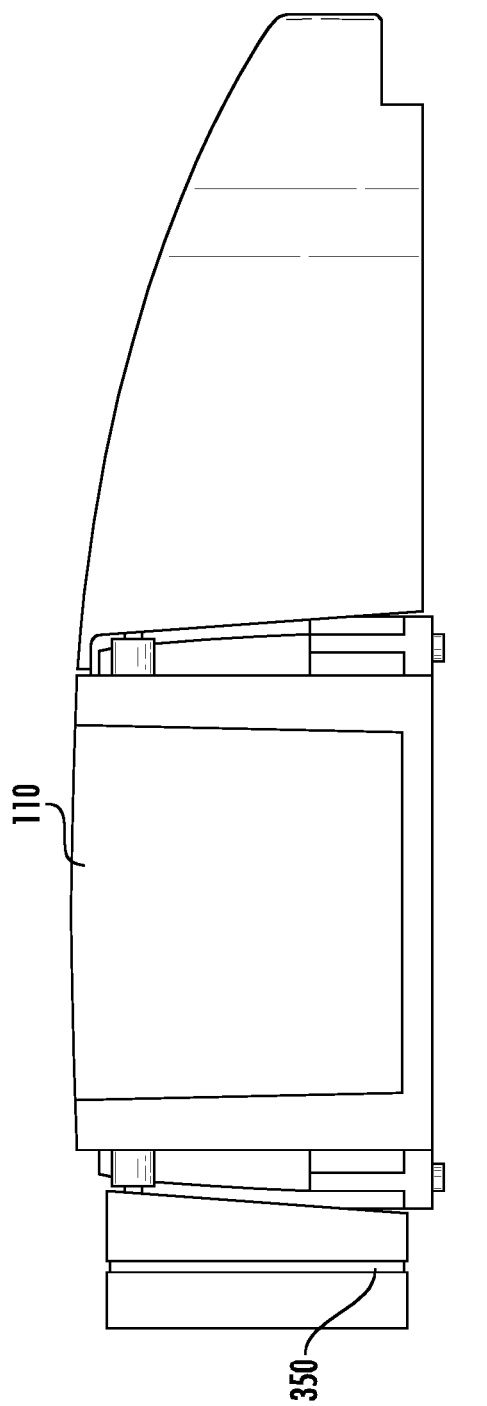

LIGHTING FIXTURE

PRIORITY CLAIM

The present application claims the benefit of priority of U.S. Application Ser. No. 62/326,209, titled "Lighting Fixture," filed Apr. 22, 2016, which is incorporated herein by reference.

FIELD

The present disclosure relates generally to lighting fixtures.

BACKGROUND

Lighting fixtures (e.g., luminaires) using light emitting diodes (LEDs) or other solid state light sources have in recent years become somewhat practical and continue to penetrate the lighting market due to the increased luminous efficacy of commercially available LED components. LED luminaires are desirable as they offer customers energy savings due to good luminous efficacy combined with the ability to precisely control light distribution patterns, which is of particular importance for certain lighting scenarios, such as outdoor environments, and open environments, such as parking garages and canopies. Electrical components for powering and controlling LED luminaires are typically contained within an associated housing.

SUMMARY

Aspects and advantages of embodiments of the present disclosure will be set forth in part in the following description, or may be learned from the description, or may be learned through practice of the embodiments.

One example aspect of the present disclosure is directed to a lighting fixture. The lighting fixture can include a housing portion and one or more modular lighting components mechanically coupled to the housing portion. Each modular lighting component can include a lighting assembly (e.g., an LED lighting assembly) and a heat sink portion. The one or more modular lighting components can be selectively removable from the housing portion to configure the lighting fixture for a plurality of different lighting configurations.

Other example aspects of the present disclosure are directed to lighting systems, light engines, lighting circuits, lighting fixtures, devices, methods, and apparatuses according to example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
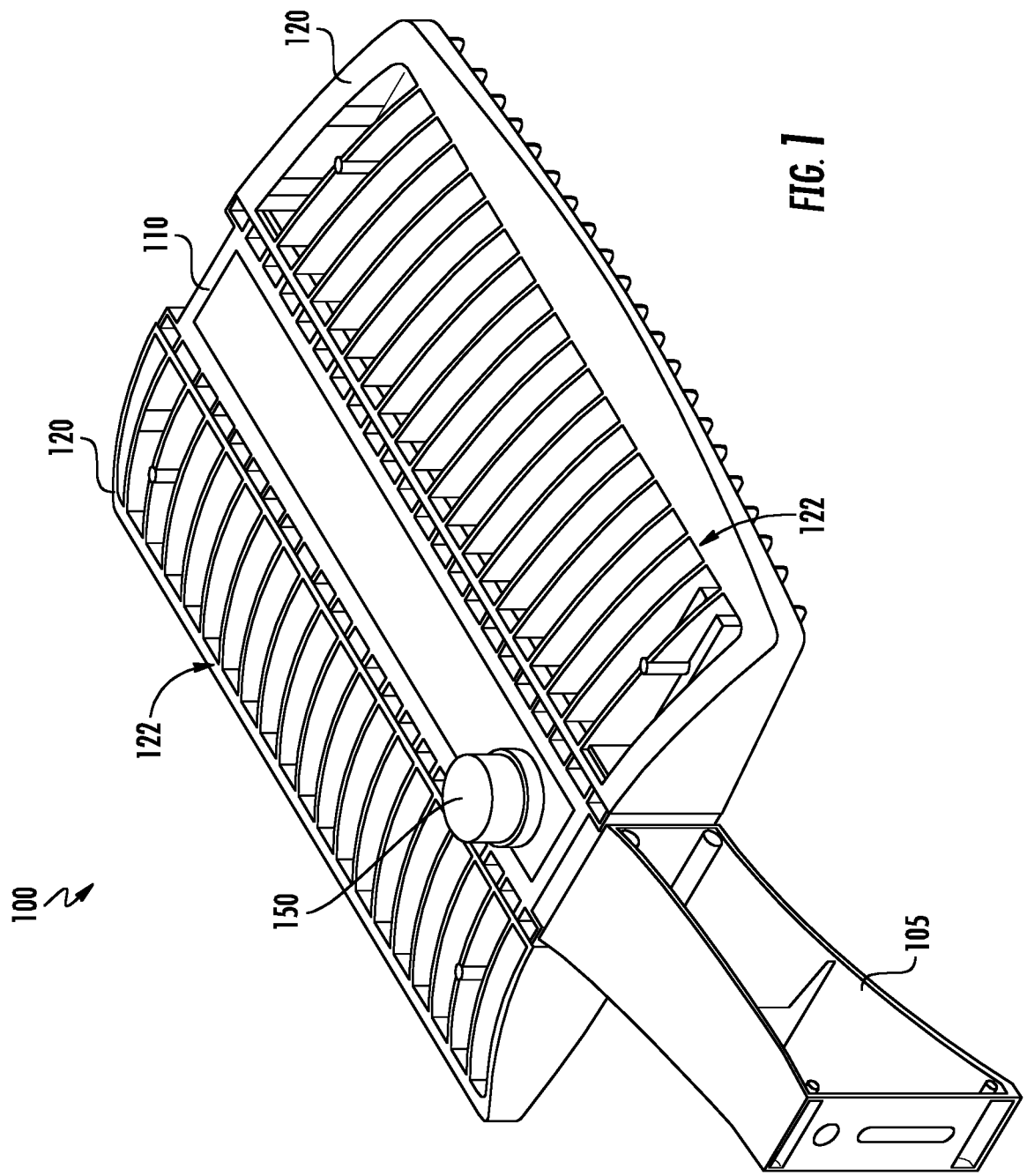
FIG. 1 depicts a perspective view of an example lighting fixture having a plurality of modular lighting components according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a lighting fixture (e.g., an LED lighting fixture) having one or more modular components to make the lighting fixture readily adaptable to many different applications, such as for use in area lighting, wall mount lighting, pole mount lighting, pendant mount lighting, flood lighting, and other lighting applications. In particular implementations, the lighting fixture can be a flexible, high output lighting fixture for area and flood applications. The lighting fixture can be a solid state lighting fixture including one or more light emitting diode (LED) light sources and can be adaptable to multiple mounting options and sizes for different lighting applications. In some examples, the lighting fixture can include one or more modular components to provide a luminous flux of up to, for instance, about 60,000 lumens or more. In particular implementations, the lighting fixture can include multiple modular components to accommodate a higher LED wattage, such as about 600 W or more of LED wattage. In some implementations, the lighting fixture can be configured to deliver about 120+ lumens per watt.

For example, the lighting fixture can include a plurality of modular components, such as first modular lighting component and a second modular lighting component. Each modular lighting component can include a lighting assembly (e.g., a LED assembly) configured to provide light at particular lumen output. Each modular component can further include a heat sink portion configured to assist with transfer of heat from the lighting assembly to the ambient surrounding the lighting fixture. The modular components can be mechanically coupled to a housing portion. The housing portion can include electrical components (e.g., surge protectors, transformers, drivers) configured to convert an alternating current power source to a DC power suitable for powering the light sources of each lighting assembly. The number of modular components mounted to the housing portion can be adapted to various different lighting applications to meet different lighting requirements.

In one example, a lighting fixture according to example embodiments of the present disclosure can include a central housing portion. The central housing portion can house electrical components of the lighting fixture (e.g., drivers). The central housing portion can be made of metal (e.g., aluminum) or other rigid material to provide sufficient structural integrity and to provide heat exchange between the driver(s) and other electrical components and the ambient air.

The lighting fixture can further include one or more wing shaped modular lighting components. The wing shaped modular lighting components can each include an LED lighting assembly comprising one or more high powered LED arrays. Each wing shaped modular lighting component can further include a heat sink portion including a plurality of cooling fins to assist with thermal transfer of heat away from the high powered LED arrays to the ambient surrounding the lighting fixture.

In example embodiments, the number of wing shaped modular lighting components mounted can be selected or adjusted to adapt the lighting fixture to various different lighting applications. For instance, in applications requiring higher lumen output or LED wattage (e.g., certain outdoor area lighting applications), the lighting fixture can include a pair of wing shaped modular lighting components mounted to the central housing portion such that the wing shaped modular components are mirror images of each other. In this example, the lumen output of each of the pair of wing shaped modular lighting components will be combined to provide increased lumen output. In applications that may not require as high a lumen output or LED wattage, only a single wing shaped modular lighting component can be mounted to the central housing portion. Further, the central housing portion can be readily adapted to be mounted in a variety of different manners (e.g., pole mount, wall mount, pendant mount, bracket mount) so that the lighting fixture is easily adaptable and in some cases convertible to many different lighting applications.

As used herein, a "lighting fixture" or "luminaire" refers to a device used to provide light or illumination using one or more light sources. The use of the term "about" when used in conjunction with a numerical value is intended to refer to within 25% of the stated numerical value. "Generally perpendicular" means within 20° of perpendicular.

Figure 2:
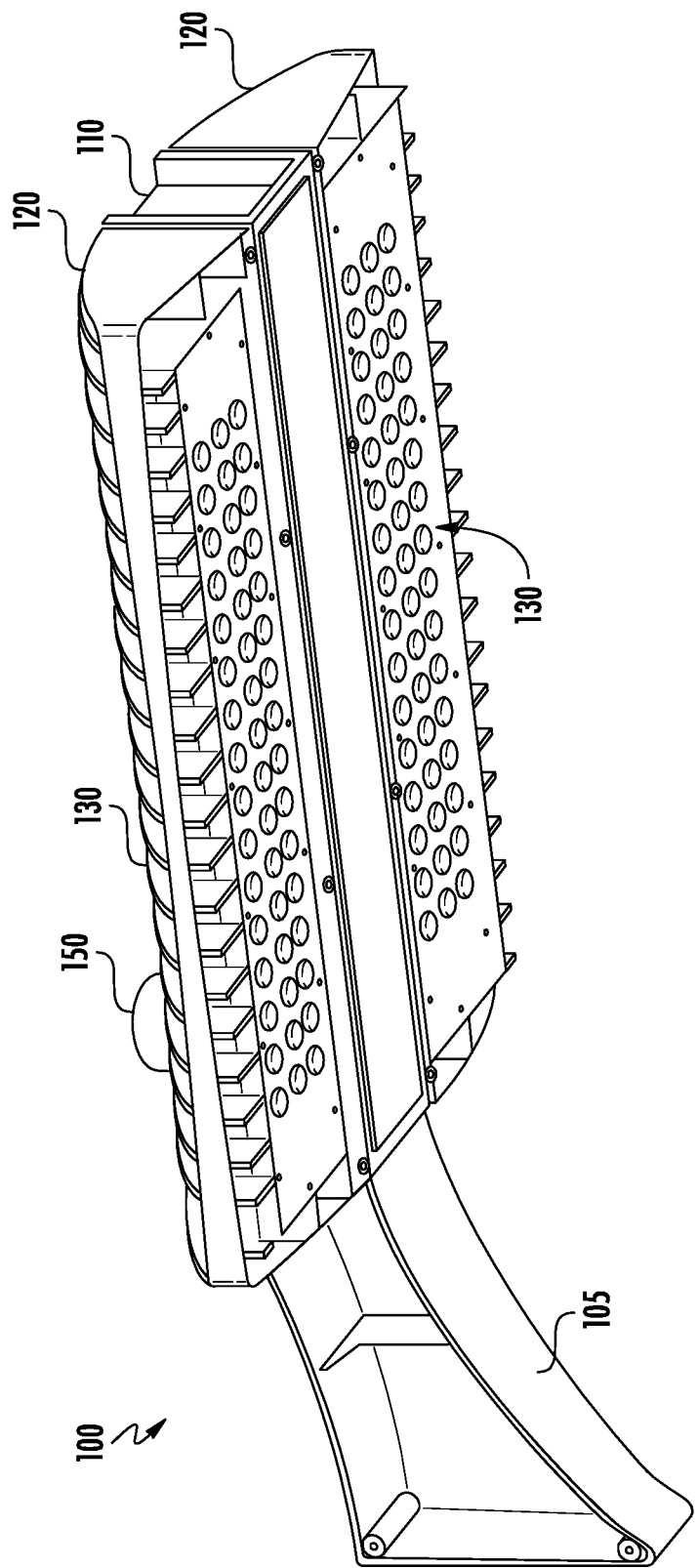
FIG. 2 depicts a bottom perspective view of an example lighting fixture having a plurality of modular lighting components according to example embodiments of the present disclosure.
Figure 3:
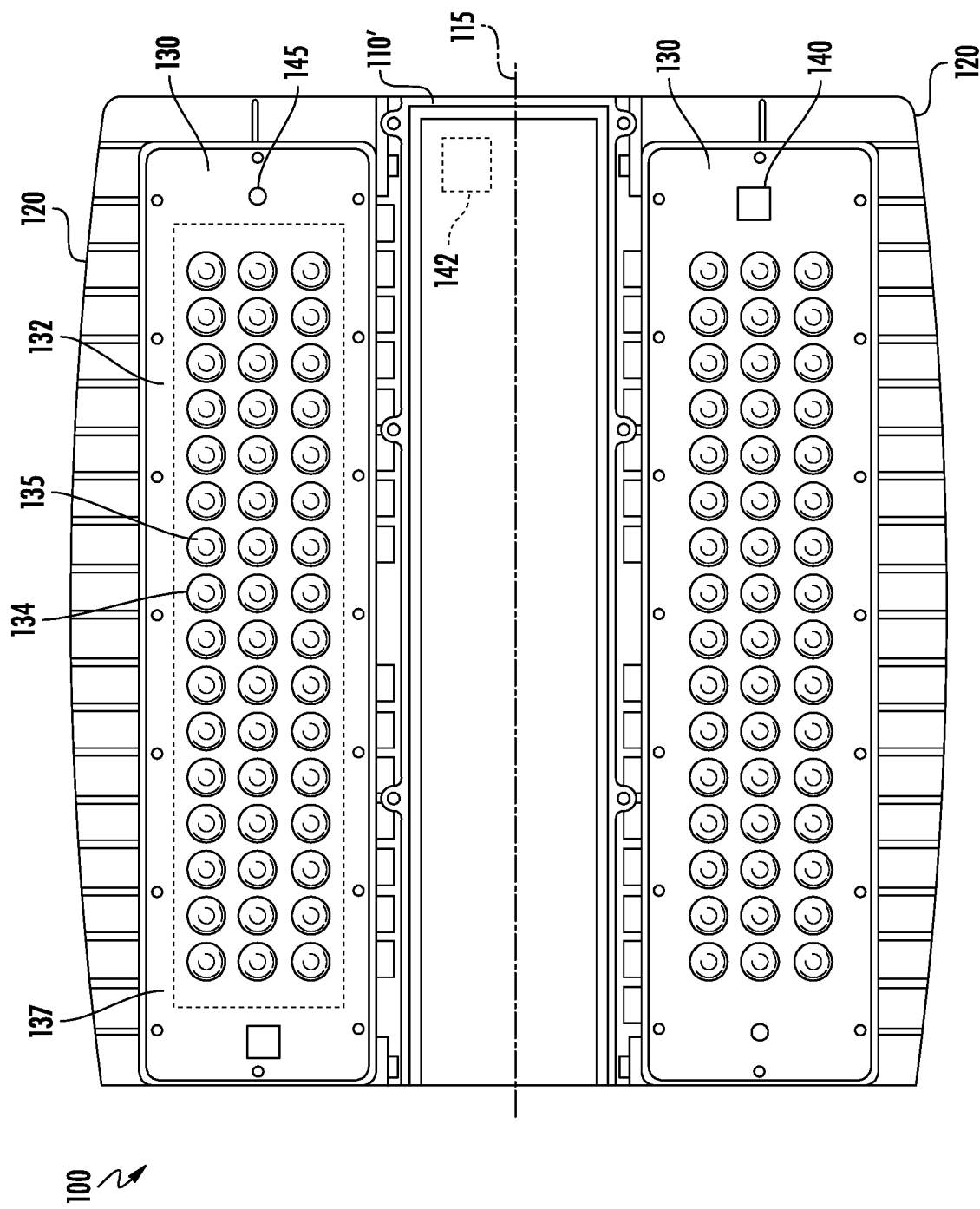
FIG. 3 depicts a bottom view of an example lighting fixture having a plurality of modular lighting components according to example embodiments of the present disclosure.

FIGS. 1-3 depict an example lighting fixture 100 according to example embodiments of the present disclosure. As will be discussed in more detail below, the lighting fixture 100 can include a plurality of modular components that can be selectively coupled to a housing portion to readily adapt the lighting fixture 100 to a plurality of different lighting applications. More particularly, the lighting fixture 100 can include a plurality of modular lighting components 120 mounted to a central housing portion 110. In particular implementations, the modular lighting components 120 can be wing shaped modular lighting components 120 as depicted in FIGS. 1-3. The wing shaped modular lighting components 120 can be mounted to the central housing portion 110 such that the wing shaped modular lighting components 120 mirror one another.

The central housing portion 110 can be configured to secure and house various components of the lighting fixture 100, such as electrical components, conductors, and other components of the lighting fixture 100. The central housing portion 110 can be made from a suitable material such as such as aluminum. Other materials, such as die cast aluminum, stainless steel, galvanized steel, powder coated steel, or other material, can be used without deviating from the scope of the present disclosure. The central housing portion 110 can act as a thermal heat sink for heat generated by electrical components of the lighting fixture 100 by conducting heat away from heat generating sources within the housing portion 110 to the ambient. In the embodiment of FIG. 1, the central housing portion 110 is secured to an arm 105, which can be used to mount the lighting fixture to a surface (e.g., a wall, pole, or other surface). As discussed in more detail below, the lighting fixture 100 can be configured in a variety of other manners for use in different lighting applications.

Each modular lighting component 120 can include a lighting assembly 130 and a heat sink portion 122. The lighting assembly 130 of each modular lighting component 120 can include an LED light engine 132 or other suitable system including a plurality of LED devices 135 mounted on an LED board. The LED devices 135 can be configured to emit light as a result of movement of electrons through a semiconductor material. The LED devices 135 can be of any suitable size, color, color temperature, etc. for desired light applications. For instance, the LED devices 135 can have a color temperature of, for instance, 3000K, 4000K, 5000K or other suitable color temperature.

An optic 134 (e.g., a lens) can be positioned over each LED device 135. The optics 134 and/or arrangement of LED devices 135 can be configured to provide a variety of different light distributions, such as a type I distribution, type II distribution, type III distribution, type IV distribution, type V distribution (e.g., round, square, round wide, etc.) or other light distribution.

A gasket (e.g., a polyurethane gasket) can be placed over the optics 134 to ensure alignment of the optics 134 with the LED devices 135 and to weatherproof the LED light engine 132. In some implementations, the gasket can aid in alignment in the direction perpendicular to the LED board, for instance, by pressing the optics 134 against the LED board. In some implementations, the lighting fixture 100 can include alignment pins that can be integral to the optics 134 and can fit into holes on the LED board to aid lateral and traverse alignment of the optics 134. The LED light engine 132 including LED devices 135 and optics 134 can be secured to a bezel 137. The bezel 137 can be made from any suitable material, such as stainless steel. In some implementations, the fixture 100 can include a one-piece bezel with integral molded-in optical elements and/or a plastic bezel with optics adhered (and/or sonically welded) to the bezel 137. The LED system 120 can be mounted into the housing portion 110 to provide a light source for the lighting fixture 100.

Example aspects of the present disclosure are discussed with LED light sources for purposes of illustration and discussion. Those of ordinary skill in the art, using the disclosures provided herein, will understand that other suitable light sources (e.g., other solid state light sources, fluorescent light sources, etc.) can be used without deviating from the scope of the present disclosure.

The heat sink portion 122 of each modular lighting component 120 can include a thermally conductive material to assist in transferring heat away from the lighting assembly 130 to the ambient. As shown in FIG. 1, the heat sink portion 122 can include a plurality of cooling fins at a location proximate to and/or above the location of the lighting assembly 130 in each modular lighting component 120. The cooling fins provide increased surface area of the heat sink portion 122 relative to the ambient to facilitate thermal transfer of heat generated by the LED devices 135 in the lighting assembly 130.

Each modular lighting component 120 can be secured to the central housing portion 110 using a suitable attachment mechanism (e.g. fastener, screw, bolt, mounting boss, docketing sleeve, hole, male/female mechanism, etc.). In the embodiment of FIGS. 1-3, two modular lighting components 120 are mounted to the central housing portion 110. More particularly, the modular lighting components 120 are mounted to the central housing portion 110 such that the modular lighting components 120 are mirror images of one another about a line 115 (shown in FIG. 3) extending across a center portion of the central housing portion 110.

Figure 4:
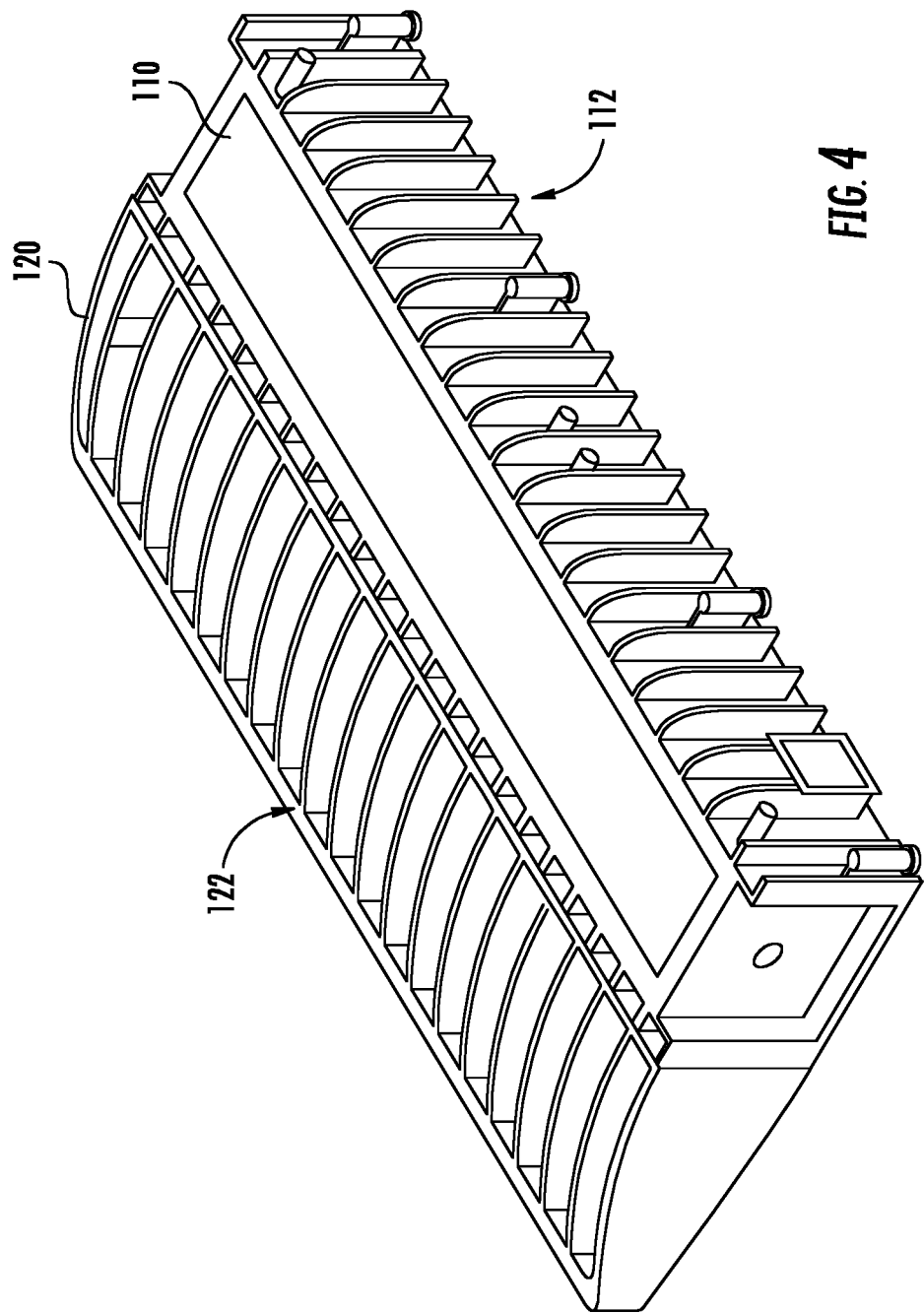
FIG. 4 depicts a perspective view of an example lighting fixture having a single modular lighting component according to example embodiments of the present disclosure.
Figure 5:
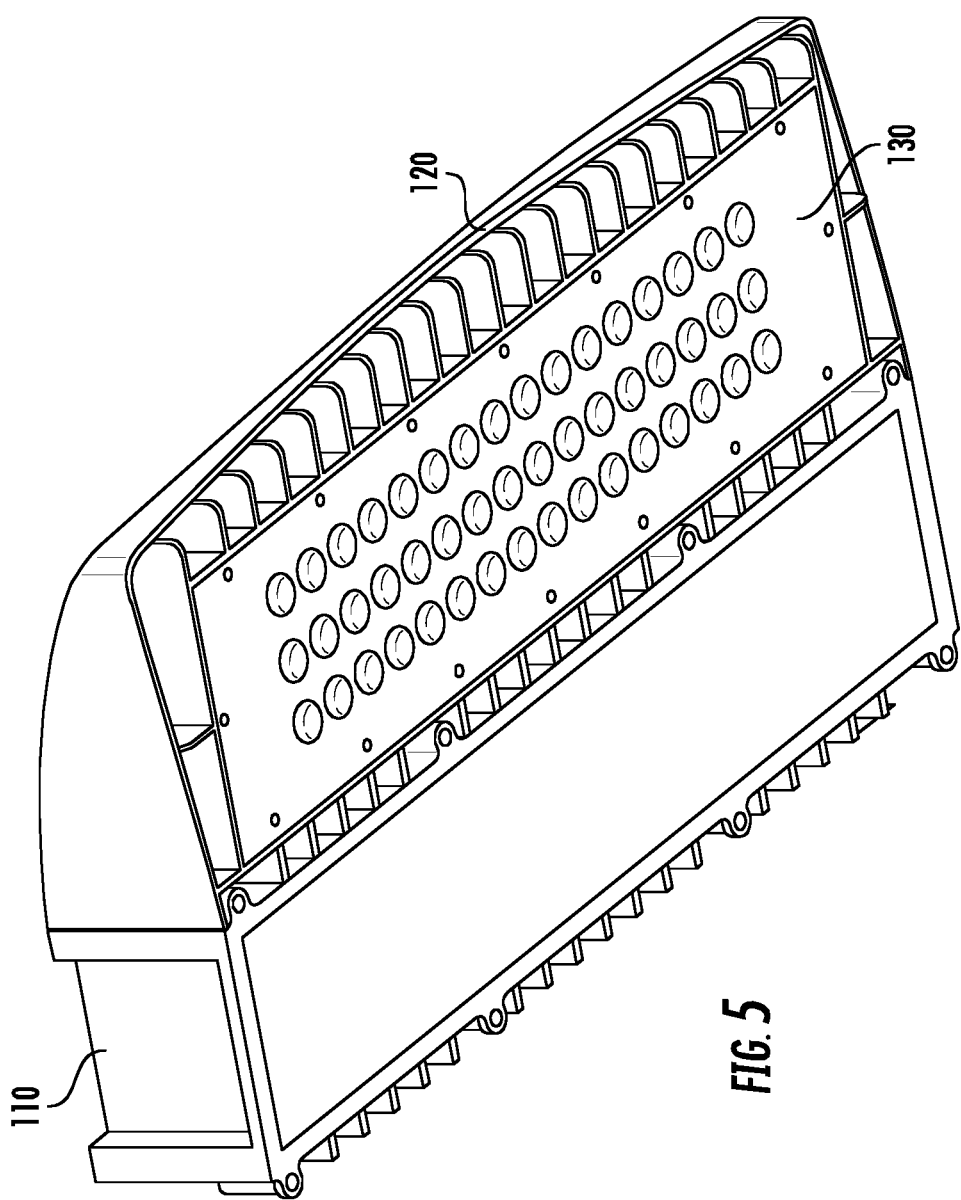
FIG. 5 depicts a bottom perspective view of an example lighting fixture having a single modular lighting component according to example embodiments of the present disclosure.

According to particular aspects of the present disclosure, more or fewer modular lighting components can be mounted to the central housing portion 110. For instance, as shown in FIGS. 4 and 5, the lighting fixture 100 can include only a single modular lighting component 120. The lighting fixture 100 shown in FIGS. 4 and 5 can be suitable for applications requiring less lumen output relative to the lighting fixture 100 with two modular lighting components 120 shown in FIGS. 1-3. As further shown in FIGS. 4 and 5, the central housing portion 110 can include cooling fins 112 to assist with thermal transfer of heat generated by internal components to the ambient.

The lighting fixture 100 can include a power circuit 200 (shown in FIGS. 6 and 7) for providing power to energize the lighting assembly 130 of each modular component 120. For instance, the power circuit can include surge protective device(s), transformer(s) and driver(s) 230 for converting an AC power to a DC power for energizing the LED devices located on the LED light engine 132 of each respective lighting assembly 130. Example drivers can accept, for instance, an about a 100V to about a 277 V 50 Hz or 60 Hz AC input or an about a 347V to 480V 50 Hz or 60 Hz AC input. In some embodiments, the drivers can be dimmable drivers. Example drivers include the PLED series drivers manufactured by Thomas Research Products. Example driver circuits are also illustrated in U.S. Patent Application Publication No. 2015/0351205, which is incorporated herein by reference.

In some embodiments, the lighting fixture 100 can include one or more control devices for controlling various aspects of the lighting fixture. For instance, in some implementations, the lighting fixture 100 can include one or more motion sensors configured to detect motion in a space around the lighting fixture. When no motion is detected for a specified period of time, one more control devices (e.g., processors, controllers, microcontrollers, application specific integrated circuits) can control operation of the driver(s) or other devices (e.g., relays) to reduce or turn off the light output (e.g., operate at a lower wattage) of the lighting fixture 100. When motion is detected, the one or more control devices can control operation of the driver(s) or other devices to operate the lighting fixture 100 to provide its full light output or other preset level.

In some embodiments, the lighting fixture 100 can include one or more photocells, such as the photocell 150 depicted in FIGS. 1 and 2. The signals from the photocell 150 can control illumination of the lighting fixture 100 via one or more on/off relays. In some embodiments, the lighting fixture 100 can include one or more control devices that can control operation of the driver(s) 230 to provide dimming based on on/off relays (which interrupt power) and/or signals indicative of a real time clock. For instance, the one or more control devices can control operation of the driver(s) to provide dimming according to a set dimming schedule, dimming based on a simple delay after activating the light sources, dimming based on hours of operation or time of night, or other suitable control scheme.

In some embodiments, the lighting fixture 100 can include a wireless module 140 (shown in FIG. 3) coupled to each of the plurality of lighting assemblies 130. The wireless module 140 can be used for communicating with a remote controller (e.g., computing device) over a wireless network. Control signals can be communicated to the lighting fixture 100 via the wireless module 140 to control the driver(s), relays, and other devices, for instance, based on set time and date schedules that are programmed using a suitable user interface. Example aspects of the wireless module 140 and example aspect of systems and methods for controlling the lighting fixture 100 using, at least in part, the wireless module 140 are discussed in U.S. Patent Application Publication No. 2015/0351205, which is incorporated herein by reference.

In alternative embodiments, signals from the lighting assemblies 130 (e.g., voltage and current sensor measurements) can be interfaced with a single controller (e.g., a wireless control module) for use in controlling the lighting fixture 100 over a wireless network. The single wireless control module can be mounted to only one of the modular lighting components 120.

The lighting fixture 100 can include other features to enhance the functionality of the lighting fixture 100. For instance, in some implementations, the lighting fixture 100 can include one or more accelerometers 142 that are configured to provide motion data for analysis to a remote device via, for instance, a wireless network (e.g., using a wireless control module). The one or more accelerometers 142 can be useful, for instance, for providing assistance in aiming the lighting fixture 100 by providing a signal indicative of an aiming angle 144 (FIG. 13) of the lighting fixture 100. In some embodiments, the lighting fixture 100 can provide an indication (e.g., via a wireless control module, via illumination of LED devices, etc.) when a present or desired aiming angle 144 is achieved. For instance, one or more control devices can be used to control illumination of the lighting assemblies 130 based at least in part on the signal indicative of the aiming angle 144 from the one or more accelerometers 142. As one example, the lighting assemblies 130 can be controlled to illuminate one or more LED devices when the signal indicative of the aiming angle 144 indicates that the fixture 100 is aimed at a preset or desired aiming angle 144.

As shown in FIG. 3, each modular lighting component 120 can include a laser assembly 145. The laser assembly 145 can emit a laser in a general direction of light emitted by the lighting assembly 130 for use in, for instance, aiming the lighting fixture 100. This can be particularly useful, for instance, in flood applications to determine an appropriate angle to mount the fixture 100 to provide desired illumination of a surface. In some embodiments, the laser can be controlled wireless via, for instance, a wireless control module. For instance, signals from a remote controller (e.g., computing device) can be received via a wireless control module and used to activate the laser assembly to emit the laser for use in aiming the fixture 100.

Figure 6:
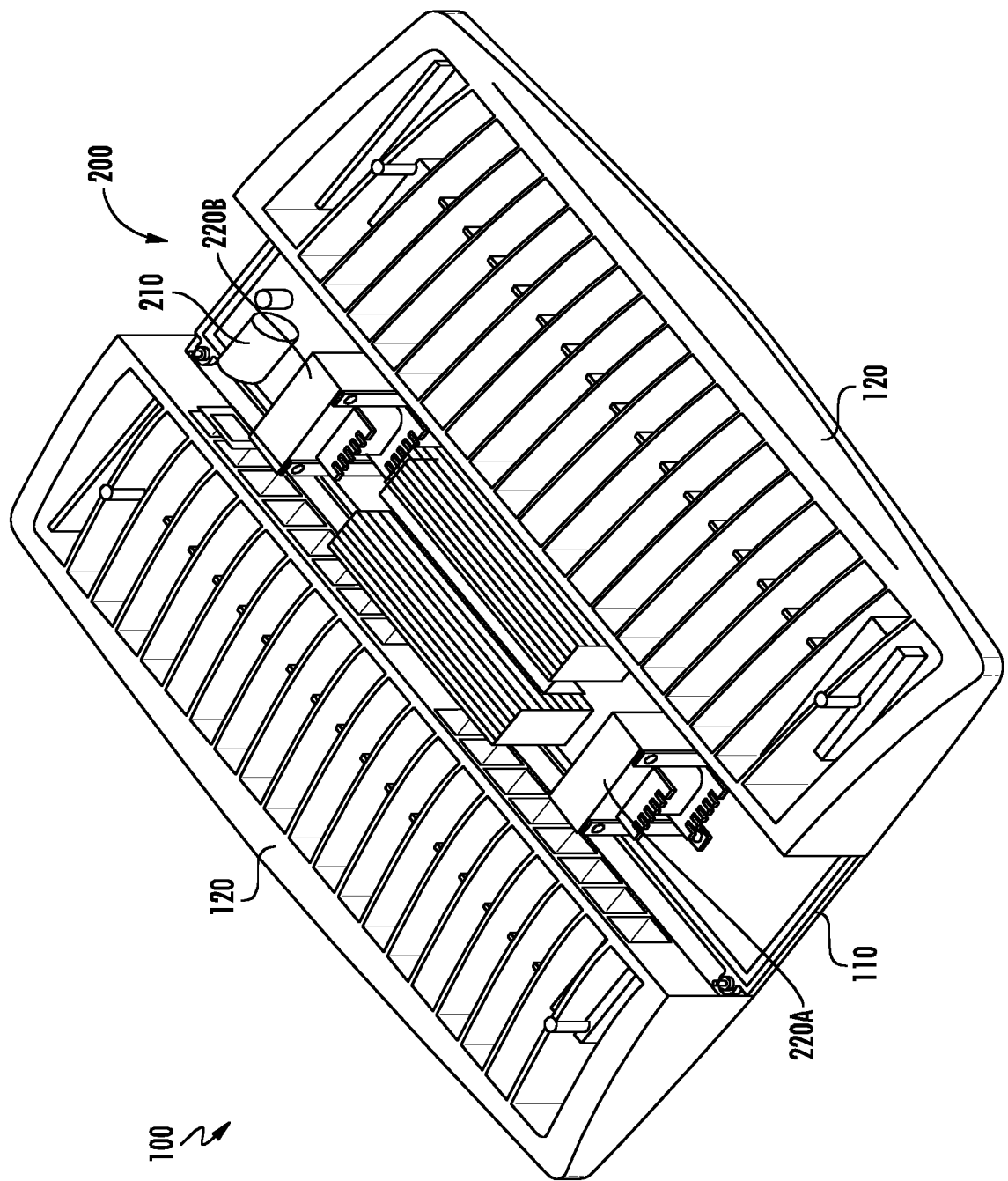
FIGS. 6-7 depict various internal components of an example lighting fixture according to example embodiments of the present disclosure.

FIG. 6 depicts an example lighting fixture 100 with a part of the central housing portion 110 removed to reveal components of a power circuit 200 used to power the lighting assemblies 130 of each modular lighting component 120 according to example embodiments of the present disclosure. The power circuit 200 can include drivers 230A and 230B. The power circuit 200 can also optionally include a surge protector 210 and transformers 220A and 220B. The numbers, types, orientations, locations, configurations, etc. of the components of the power circuit 200 shown in FIG. 6 are provided for purposes of illustration and discussion and are not intended to be limiting. For example, the components of the power circuit 200 can be located in various different orientations, sizes, locations, configurations, etc. Additionally, and/or alternatively, the power circuit 200 can include more, less, and/or different components than shown.

In the example of FIG. 6, the power circuit includes a transformer and driver for each modular lighting component 120. For instance, transformer 220A and driver 230A can be configured to condition power for energizing the lighting assembly 130 associated with one of the modular lighting components 120. Transformer 220B and driver 230B can be configured to condition power for energizing the lighting assembly 130 associated with the other modular lighting component 120. In implementations with only a single modular lighting component 120, the power circuit 200 can include only a single transformer (e.g., 220A) and a single driver (e.g., 230A). Other suitable power circuits can be used without deviating from the scope of the present disclosure. For instance, power circuits that do not make use of transformers can be used without deviating from the scope of the present disclosure.

The power circuit 200 can be configured to convert alternating current (AC) from a power source (not shown) to direct current (DC) for use by the lighting fixture (e.g., a light engine). The surge protector 210 can be configured to initially receive electrical current from a power source (e.g., a power grid, battery) and to protect the power circuit 200 and other electrical components of the lighting fixture 100 from spikes, lightning induced surges, electrical anomalies, etc. The power circuit 200 can be configured to include different types, and/or sizes of the surge protector 210. The surge protector 210 can be configured in series and/or in parallel. In some implementations, the surge protector 210 include a mechanism to shut of fixture power when the surge protector 210 is exhausted.

The transformers 220A and 220B can be configured to alter the voltage for use by the drivers 230A and 230B. For example, the transformers 220A and 22B can be a step-down transformer that can be configured to decrease the voltage of the input AC power to a voltage level suitable for the drivers 230A and 230B (e.g., about 100 to about 277V).

The drivers 230A and 230B can be configured to convert the current from AC power to DC power. Additionally, and/or alternatively, the drivers 230A and 230B can provide constant current and/or DC power to one or more component(s) of the fixture 100, such as a light engine. In this way, the light engine can illuminate one or more LED devices when energized by one of the drivers 230A and 230B. As discussed above, the drivers 230A and 230B can be dimmable driver(s). Example driver circuits include the PLED series drivers manufactured by Thomas Research Products. Example driver circuits are disclosed in U.S. Patent Application Publication No. 2015/0351205, which is incorporated herein by reference.

Figure 7:
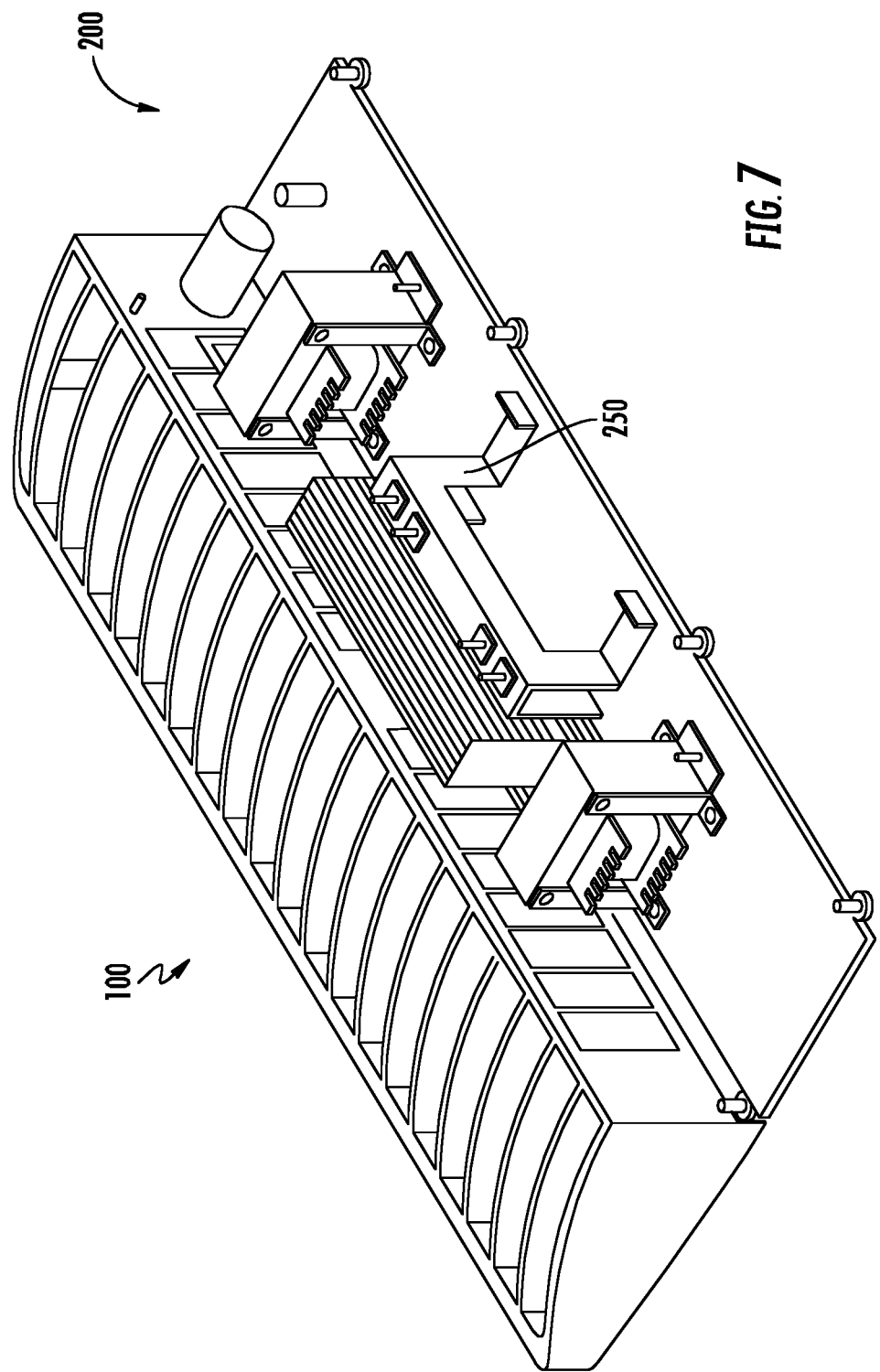

The central housing portion 110 can include means for securing the one or more drivers 230A and 230B to the housing to decrease thermal resistance between one or more of the drivers and the housing. As shown in FIG. 7, the means can include a clamp bar 250 used to secure the driver to the central housing portion 110. The driver 230B is removed from the illustration shown in FIG. 7 for ease of illustration. In some embodiments, the clamp bar 250 can hook into a recess on the central housing portion 110 and can grip the driver from a side facet of the driver. In some embodiments, the clamp bar 250 can be attached to the housing via one or more attachment mechanism(s). The attachment mechanism(s) can include a mounting boss, docketing sleeve, hole, male/female mechanism, etc. The clamp bar 250 can have any suitable shape or configuration and is not limited to the shape illustrated in FIG. 7.

The clamp bar 250 can be configured to facilitate and/or enhance heat transfer between the driver and the central housing portion 110. The clamp bar 150 can be configured to provide a force to the driver (e.g., in a direction generally perpendicular to the top surface). Upon application of the force, the driver can be pressed against the central housing portion 110 to increase the surface area of the driver that is contacting the central housing portion 110. In this way, the clamp bar 250 can increase the amount of heat transferred between the driver and the central housing portion 110, which can act as a passive heat exchanger to transfer the heat generated by the driver into the ambient surrounding the lighting fixture 100. More particularly, the clamp bar 250 can be configured to decrease thermal resistance between the driver and the central housing portion 110. In some implementations, the lighting fixture 100 can include a component between the driver and the central housing portion 110, such as a heat spreader, to further facilitate the heat exchange.

The lighting fixture 100 can be mounted and configured in a variety of manners to provide illumination in a variety of different lighting applications. Example configurations of the lighting fixture 100 are illustrated in FIGS. 8-22.

Figure 8:
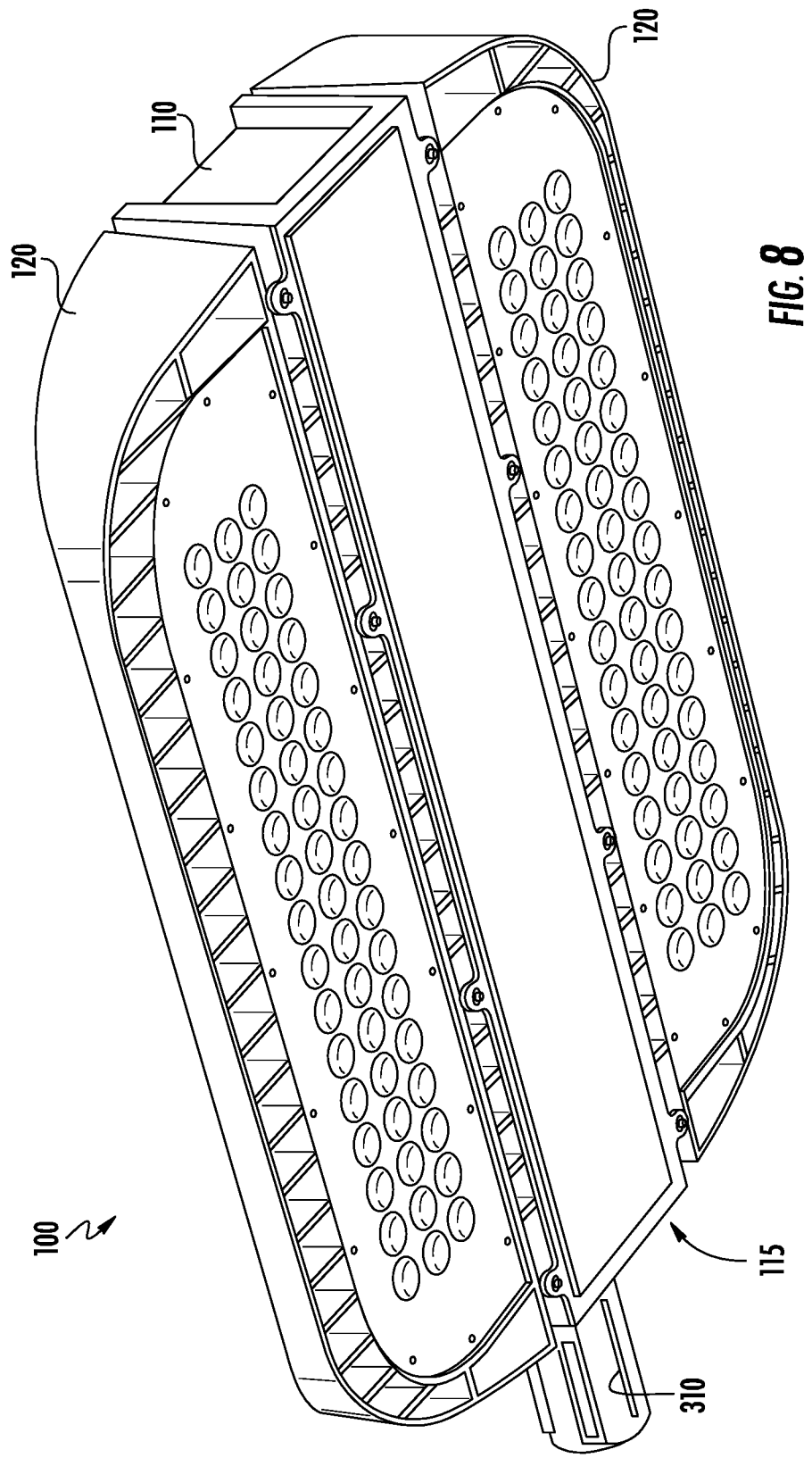
FIGS. 8, 9, 10, 11, 12, 13, 14, 15, 16, 17, 18, 19, 20 and 21 depict different configurations of an example lighting fixture according to example embodiments of the present disclosure.
Figure 9:
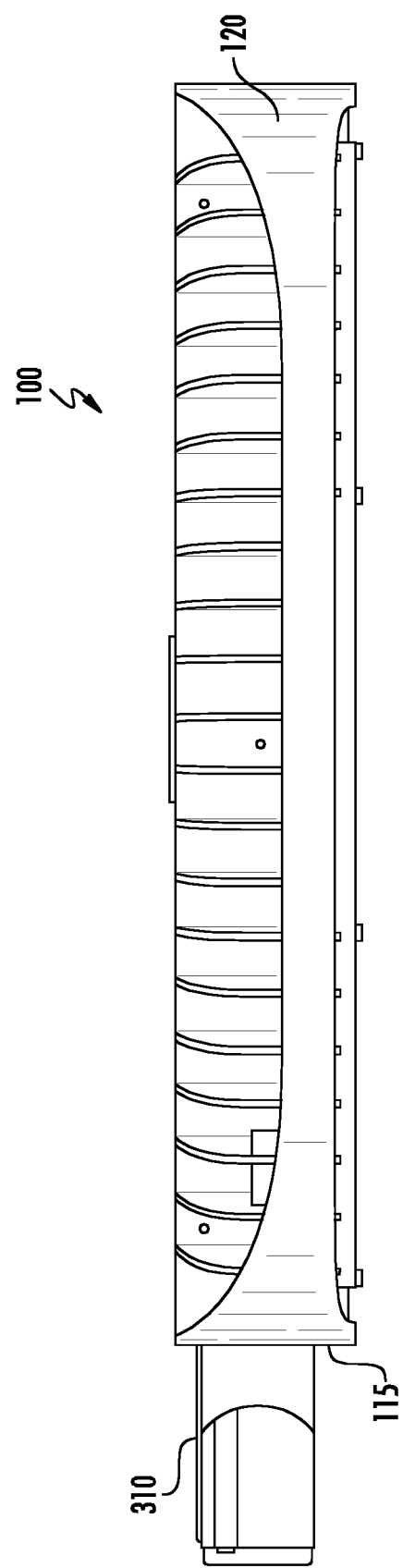

More particularly, FIGS. 8 and 9 depict one example configuration of a lighting fixture 100 according to example embodiments of the present disclosure. The lighting fixture 100 includes two modular lighting components 120 mounted to the central housing portion 110. As shown, the lighting fixture 100 includes an arm mount 310 mechanically coupled to an end portion 115 of the central housing portion 110. The arm mount 310 can be used to mount the lighting fixture 100 to a pole, a wall, or other suitable surface. The configuration of the lighting fixture 100 shown in FIGS. 8 and 9 can be used, for instance, in area lighting applications requiring high lumen output.

Figure 10:
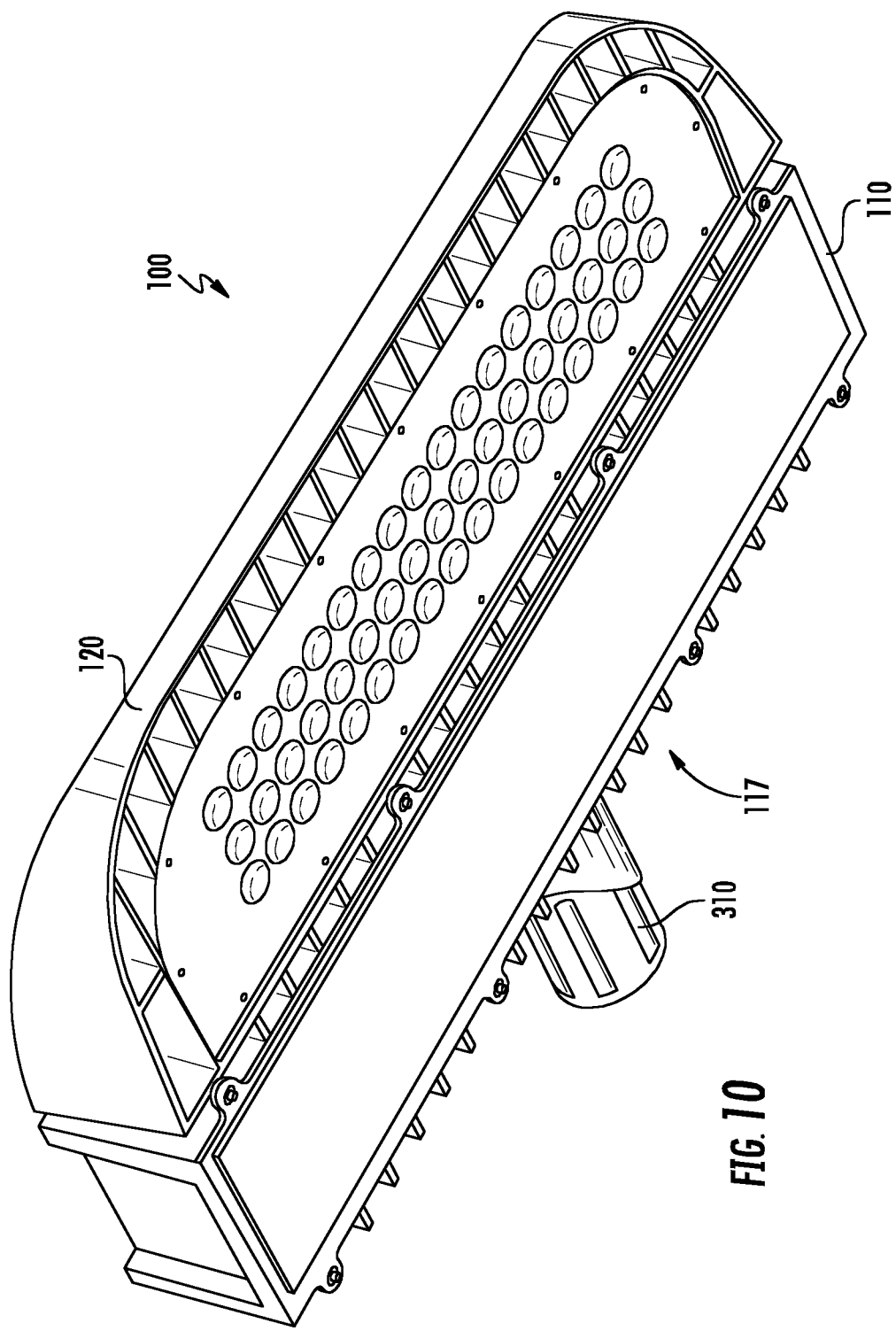
Figure 11:
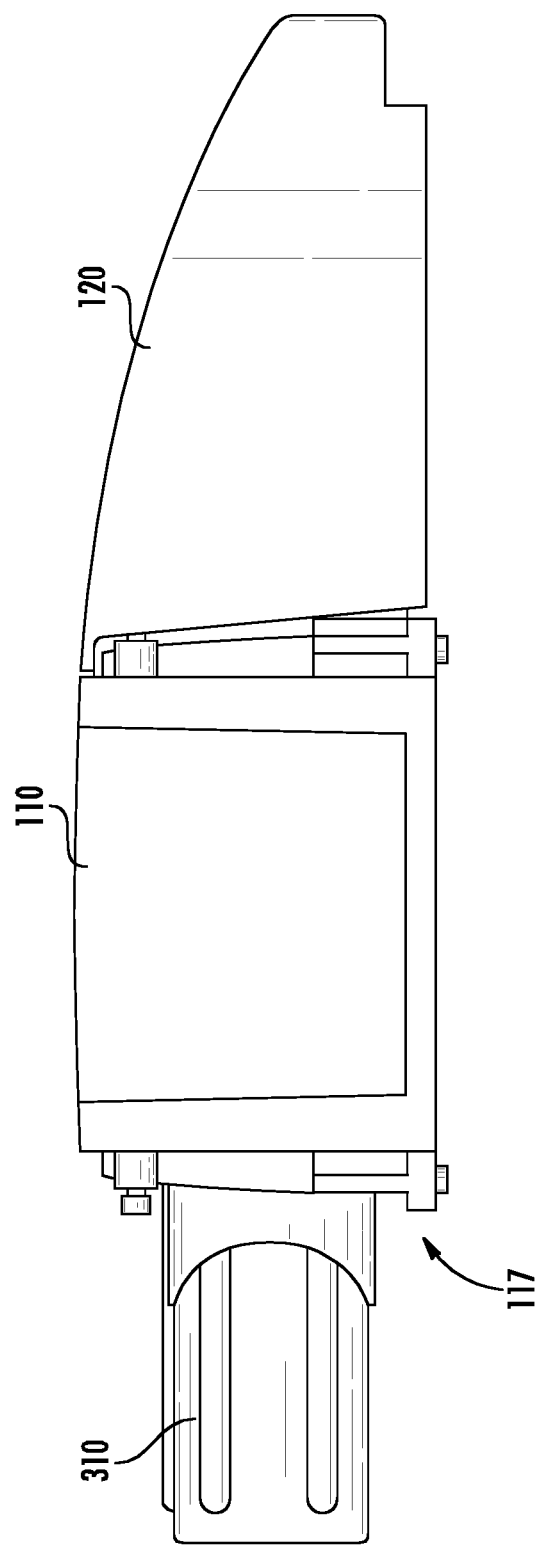

FIGS. 10 and 11 depict another example configuration of a lighting fixture 100 according to example embodiments of the present disclosure. The lighting fixture 100 includes a single modular lighting component 120 mounted to the central housing portion 110. As shown, the lighting fixture 100 includes an arm mount 310 mechanically coupled to a center portion 117 of a sidewall of the central housing portion 110. The arm mount 310 can be used to mount the lighting fixture 100 to a pole, a wall, or other suitable surface. The configuration of the lighting fixture 100 shown in FIGS. 10 and 11 can be used, for instance, in area lighting applications requiring reduced lumen output relative to the configuration of the lighting fixture 100 shown in FIGS. 8 and 9.

Figure 12:
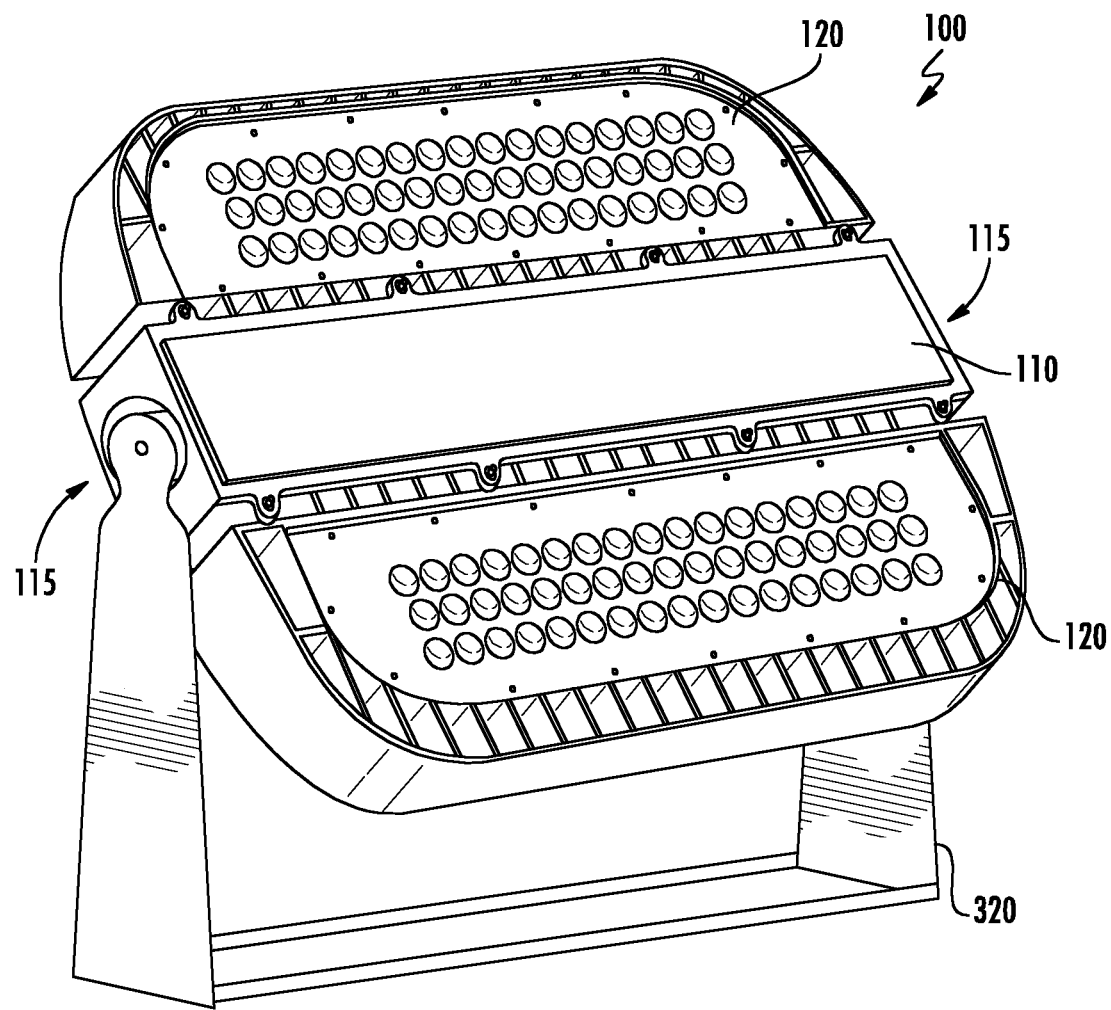
Figure 13:
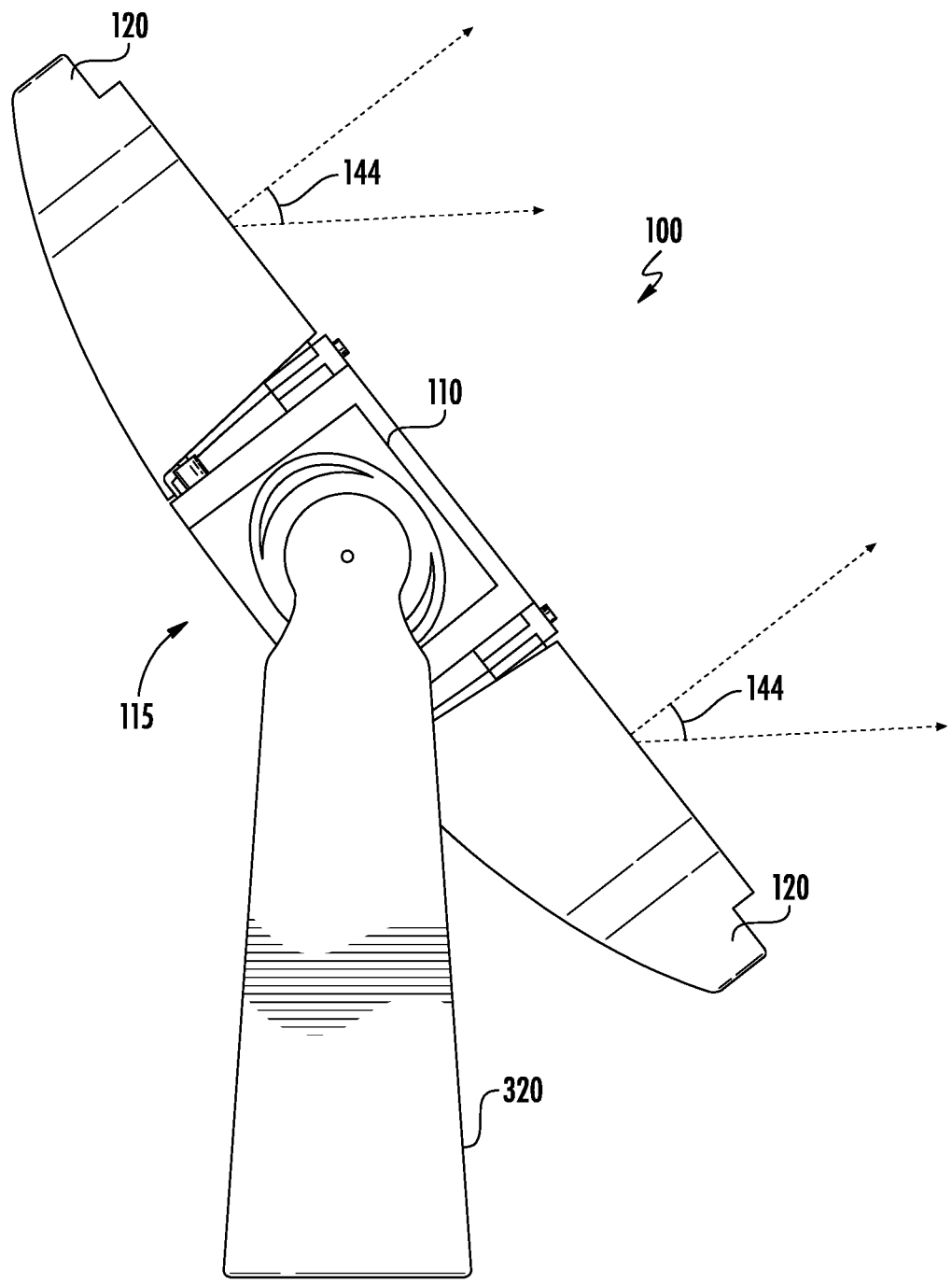

FIGS. 12 and 13 depict one example configuration of a lighting fixture 100 according to example embodiments of the present disclosure. The lighting fixture 100 includes two modular lighting components 120 mounted to the central housing portion 110. As shown, the lighting fixture 100 includes a flood mount 320 mechanically coupled to the end portions 115 of the central housing portion 110. The configuration of the lighting fixture 100 shown in FIGS. 12 and 13 can be used, for instance, in flood lighting applications requiring high lumen output.

Figure 14:
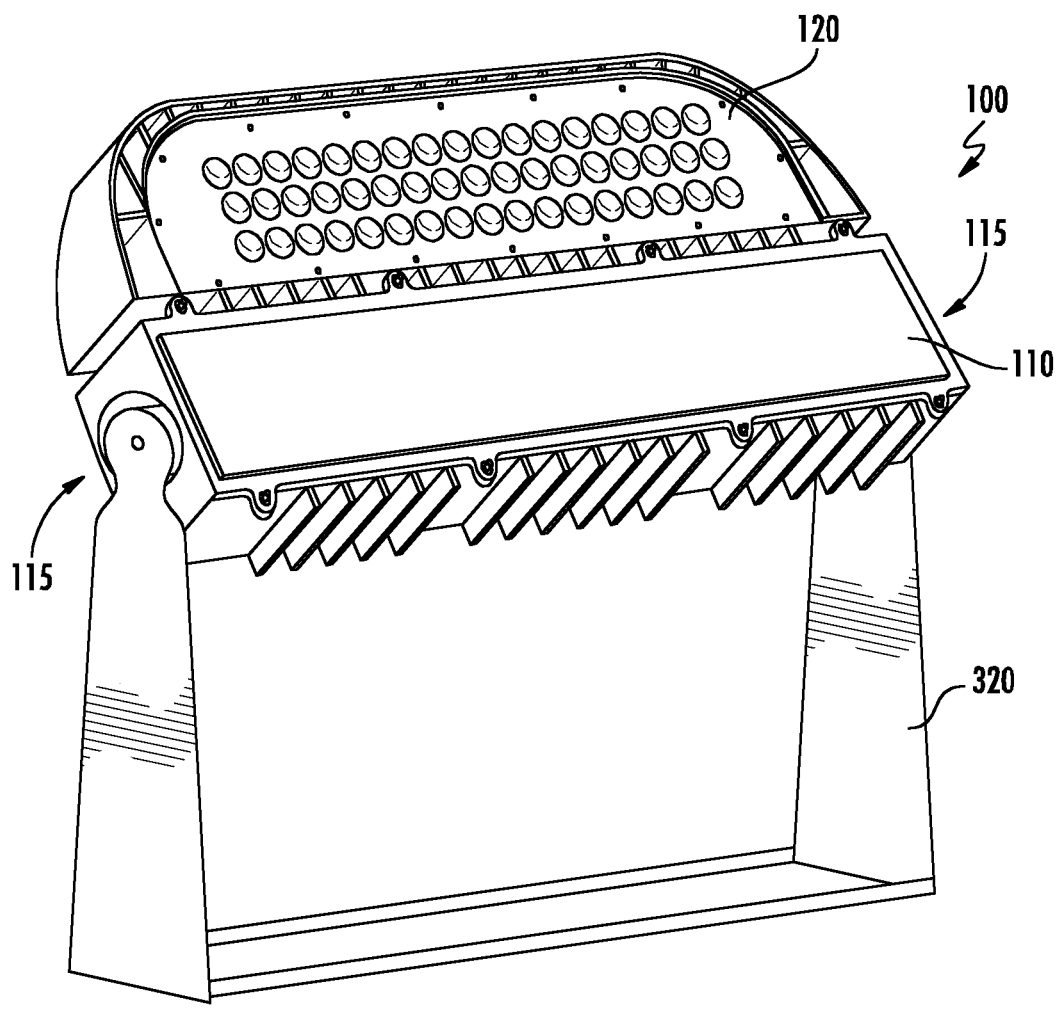
Figure 15:
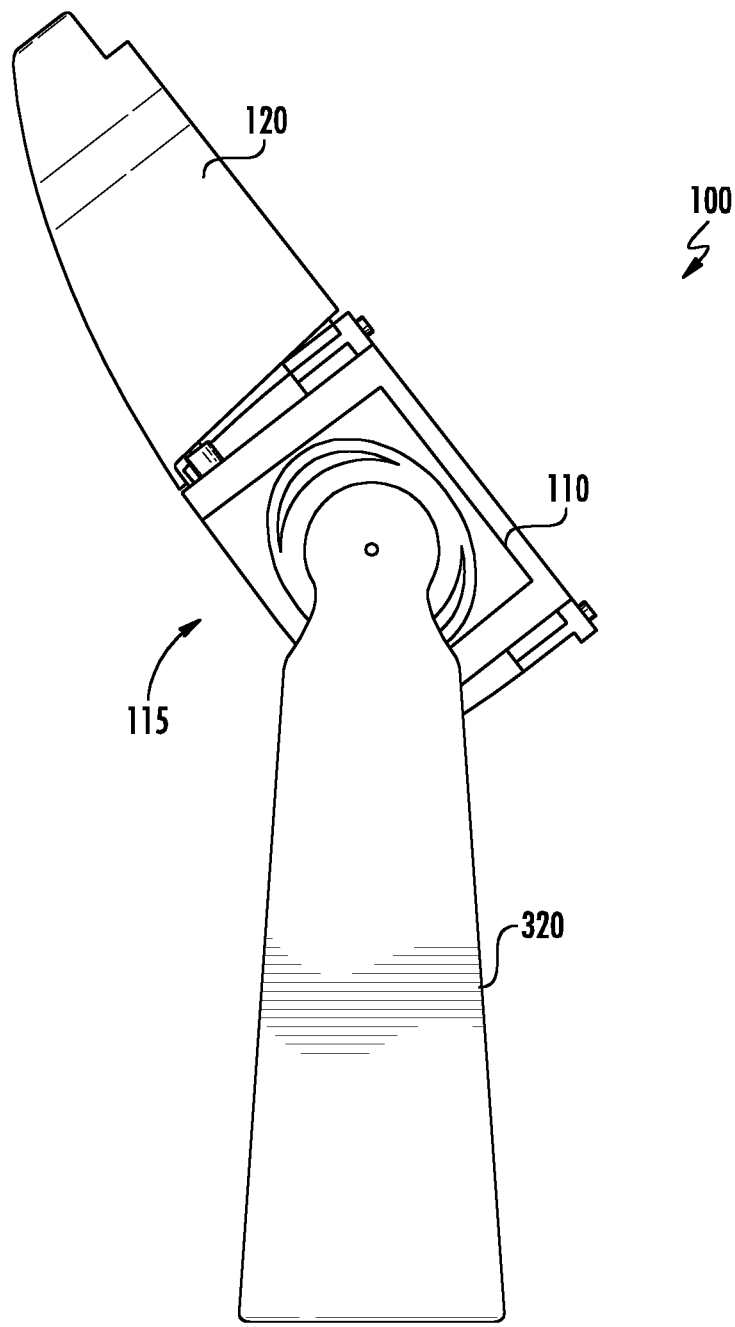

FIGS. 14 and 15 depict another example configuration of a lighting fixture 100 according to example embodiments of the present disclosure. The lighting fixture 100 includes a single modular lighting component 120 mounted to the central housing portion 110. As shown, the lighting fixture 100 includes a flood mount 320 mechanically coupled to the end portions 115 of the central housing portion 110. The configuration of the lighting fixture 100 shown in FIGS. 14 and 15 can be used, for instance, in flood lighting applications requiring reduced lumen output relative to the configuration of the lighting fixture 100 shown in FIGS. 8 and 9. In some embodiments, the lighting fixture 100 shown in FIGS. 12-15 can include a laser assembly for use in emitting a laser to assist with aiming the lighting fixture to provide a desired lighting effect.

Figure 16:
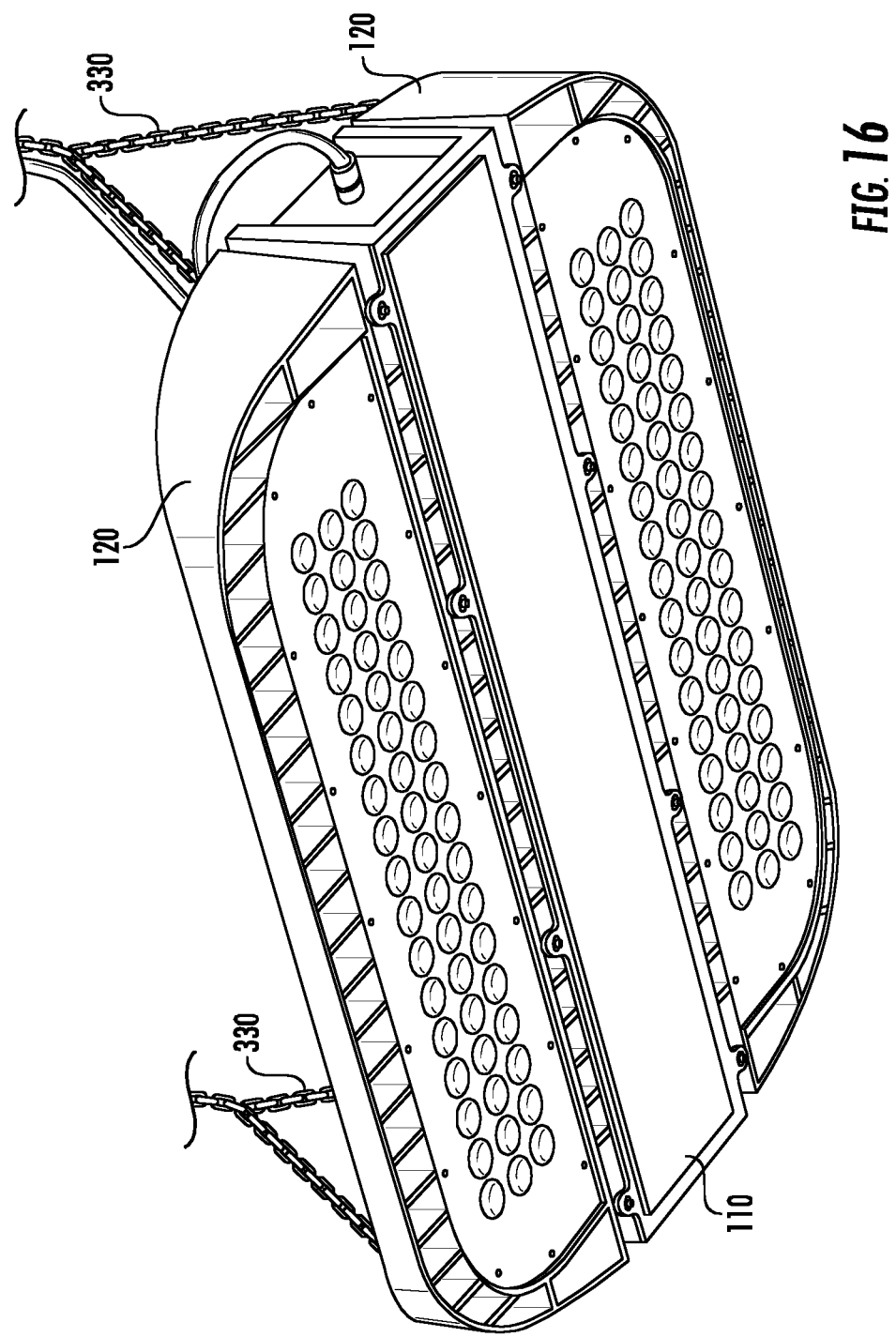
Figure 17:
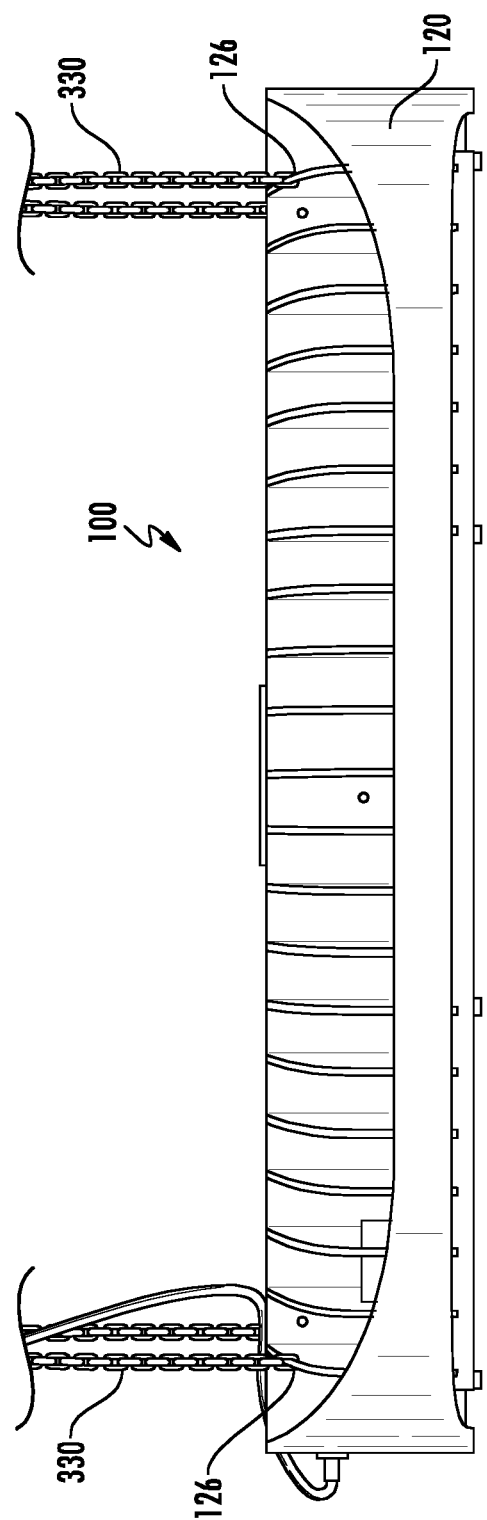

FIGS. 16 and 17 depict one example configuration of a lighting fixture 100 according to example embodiments of the present disclosure. The lighting fixture 100 includes two modular lighting components 120 mounted to the central housing portion 110. As shown, the lighting fixture 100 includes a pendant mounts 330 mechanically coupled to the attachment mechanisms 126 of the modular lighting components 120 to suspend the lighting fixture 100 from a ceiling or other surface. The configuration of the lighting fixture 100 shown in FIGS. 16 and 17 can be used, for instance, in area lighting applications requiring high lumen output, such as high bay lighting in factory, industrial, or warehouse lighting applications.

Figure 18:
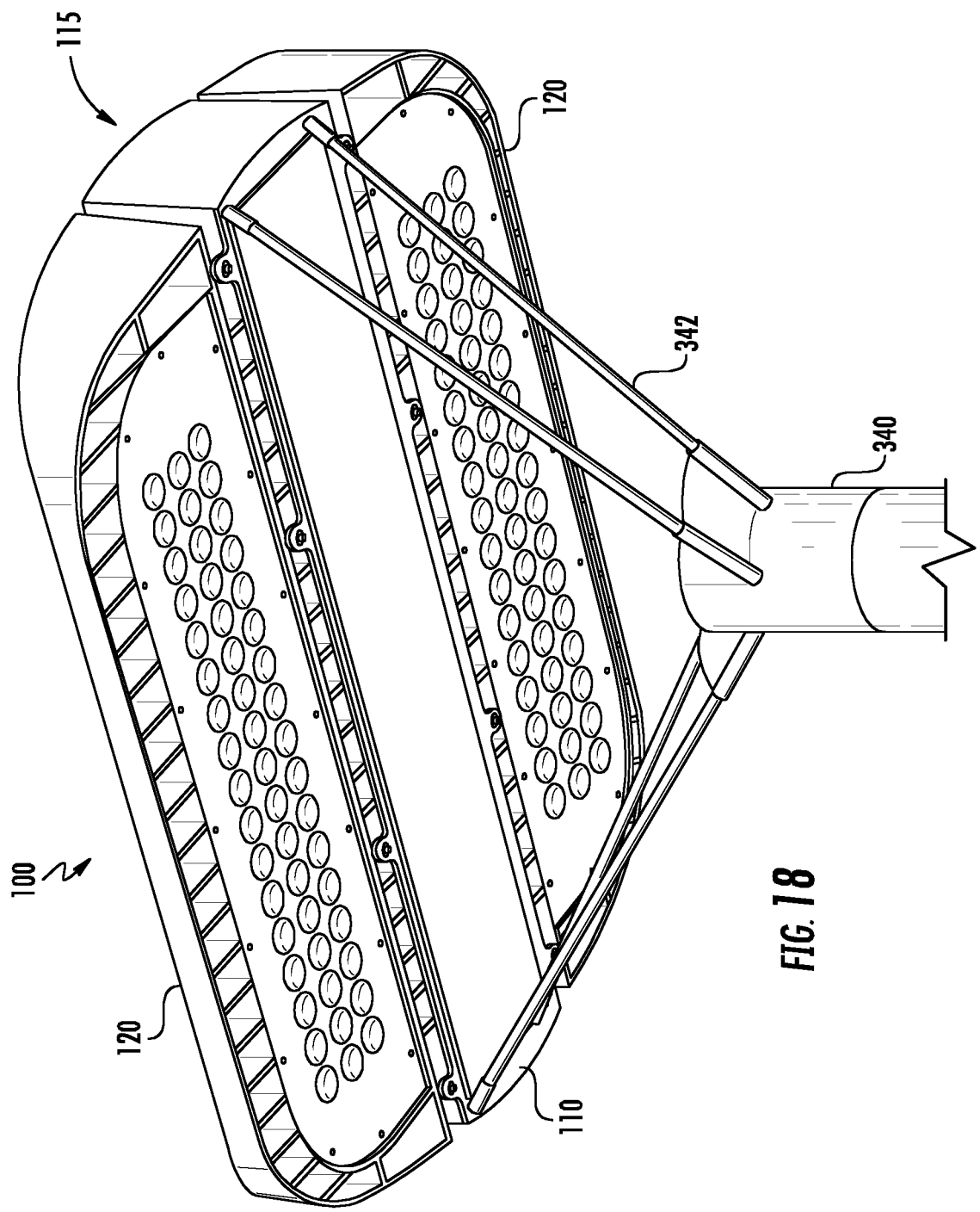
Figure 19:
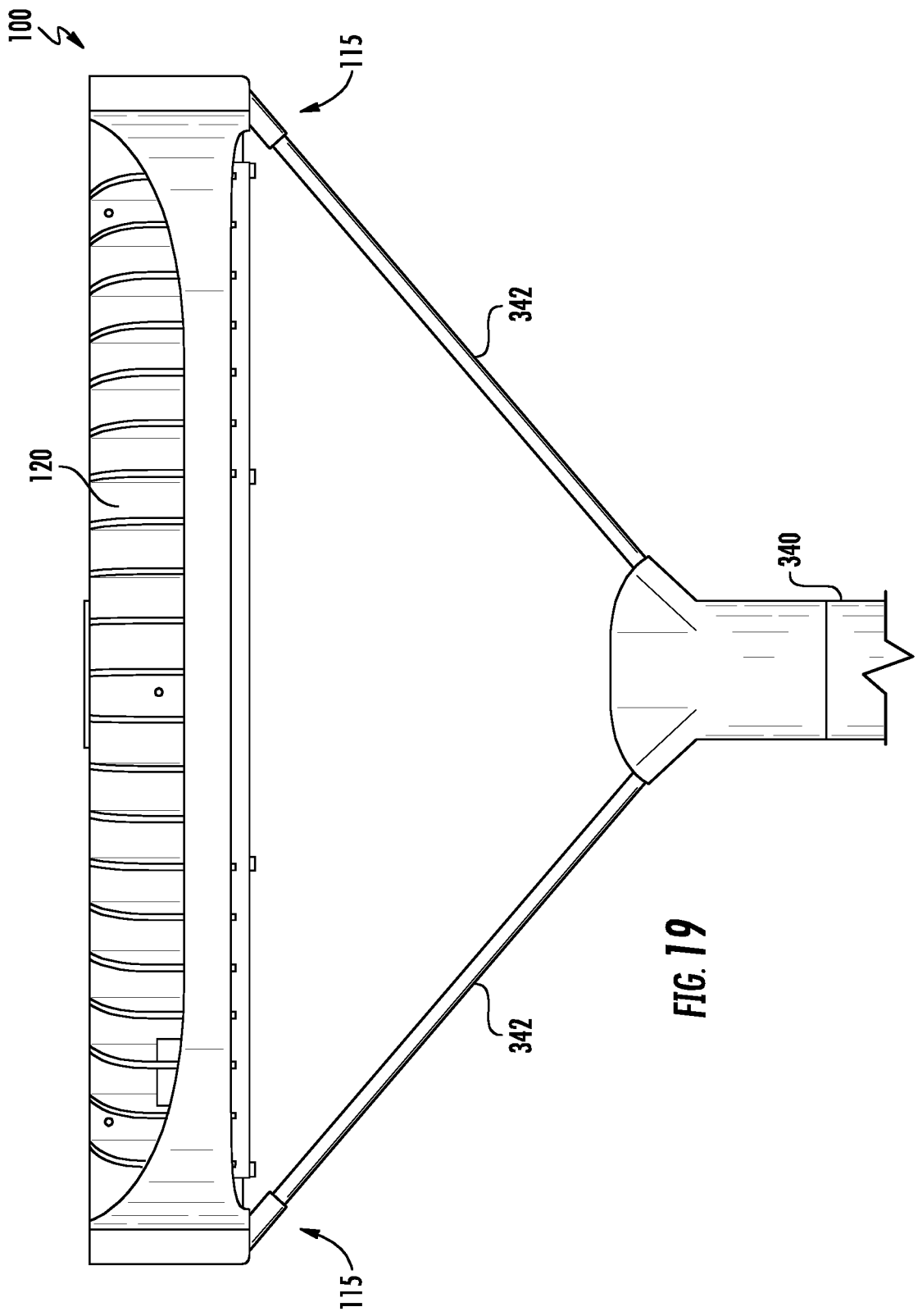
Figure 20:
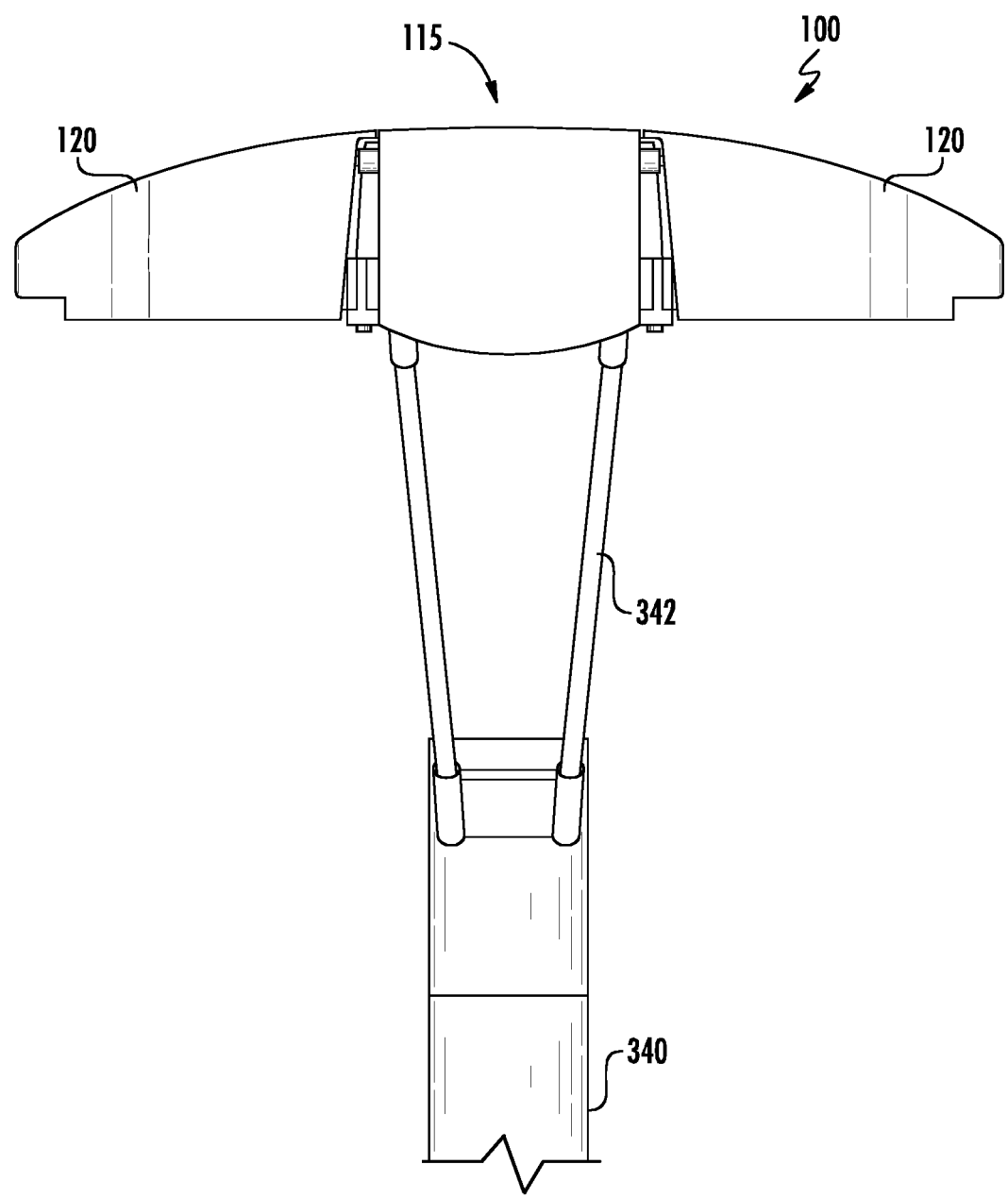

FIGS. 18-20 depict one example configuration of a lighting fixture 100 according to example embodiments of the present disclosure. The lighting fixture 100 includes two modular lighting components 120 mounted to the central housing portion 110. As shown, the lighting fixture 100 includes arm mounts 342 configured to secure the lighting fixture to a pole 340. More particularly, the arm mounts 342 are attached to a fitter which can slip over a tenon secured to the pole 340 and secured with an appropriate attachment mechanism (e.g., screws, fasteners, bolts, etc.). The arm mounts 342 can be secured to end portions 115 of the central housing portion 110. In some embodiments, the arm mounts 342 can be secured to a special adaptor provided at the end portions 115 of the central housing portion 110. The configuration of the lighting fixture 100 shown in FIGS. 18-20 can be used, for instance, in area lighting applications requiring high lumen output.

Figure 21:
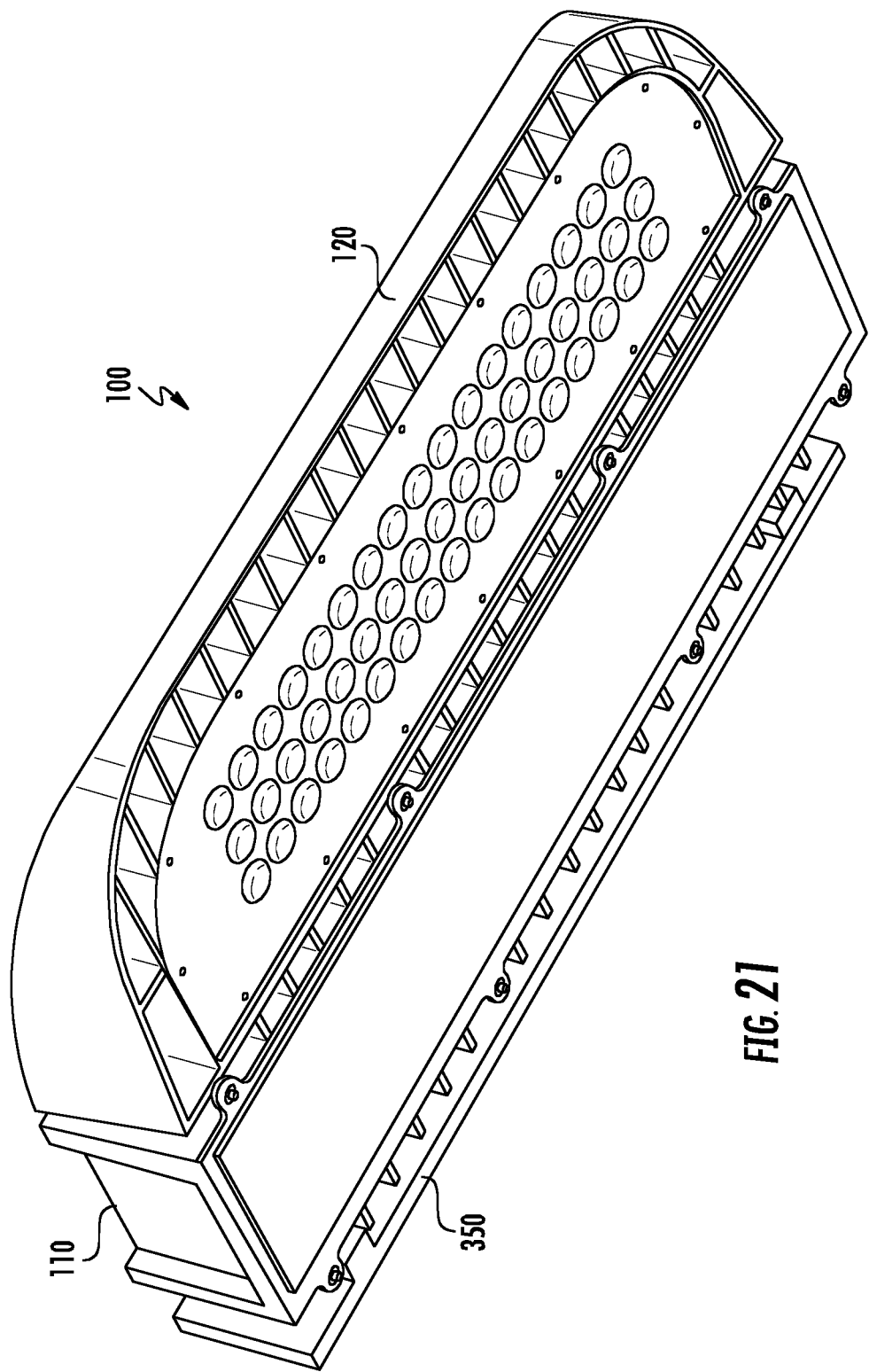

FIGS. 21 and 22 depict another example configuration of a lighting fixture 100 according to example embodiments of the present disclosure. The lighting fixture 100 includes a single modular lighting component 120 mounted to the central housing portion 110. As shown, the lighting fixture 100 includes wall bracket 350 configured to mount the lighting fixture 100 to a wall or other surface to configure the lighting fixture 100 as, for instance, a wall pack. The wall bracket 350 can be mounted to a side portion of the central housing portion 110. The configuration of the lighting fixture 100 shown in FIGS. 21 and 22 can be used, for instance, in area lighting applications near a wall or other surface. IN some embodiments, the central housing portion can have an integrated wall-mountable feature so that the lighting fixture 100 can be mounted to a surface without requiring wall bracket 350.

The example configurations illustrated in FIGS. 8-22 are provided for purposes of illustration and discussion. Those of ordinary skill in the art, using the disclosures provided herein will understand that other example configurations can be generated using the lighting fixture 100 without deviating from the scope of the present disclosure. In some embodiments, the different mounts described herein (such as upswept arm, mast arm fitter, slip fitter, post-top mount) mate with the center section using any suitable connection, such as a two-bolt mounting interface.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A lighting fixture, comprising:
   a housing portion;
   a modular lighting component mechanically coupled to the housing portion at a sidewall of the housing portion, the modular lighting component comprising a lighting assembly and a heat sink portion, the lighting assembly comprising a plurality of LED devices and a plurality of lenses, each lens secured relative to one of the plurality of LED devices;
   wherein the modular lighting component is selectively removable from the housing portion to configure the lighting fixture for a plurality of different lighting applications, and
   wherein the housing portion comprises a plurality of cooling fins, at least one cooling fin of the plurality of cooling fins extending outwardly from the sidewall of the housing portion such that the at least one cooling fin is positioned between the housing portion and the modular lighting component.

2. The lighting fixture of claim 1, wherein the housing portion is a central housing portion.

3. The lighting fixture of claim 2, wherein the central housing portion houses one or more drivers.

4. The lighting fixture of claim 3, further comprising:
   a clamp bar securing the one or more drivers to the central housing portion.

5. The lighting fixture of claim 1, wherein each heat sink portion comprises a plurality of cooling fins.

6. The lighting fixture of claim 1, wherein the lighting fixture is configured as a pole mount fixture, wall mount fixture, flood light fixture, or pendant mount fixture.

7. The lighting fixture of claim 1, wherein the modular lighting component comprises a wireless control module.

8. The lighting fixture of claim 1 wherein the modular lighting component comprises a laser assembly configured to emit laser light for use in aiming the lighting fixture.

9. A lighting fixture, comprising:
   a housing portion; and
   a modular lighting component mechanically coupled to the housing portion at a sidewall of the housing portion, the modular lighting component comprising a lighting assembly and a laser assembly, the lighting assembly comprising a plurality of LED devices, the laser assembly configured to emit laser light in a general direction of light emitted by the plurality of LED devices of the lighting assembly;

wherein the modular lighting component is selectively removable from the housing portion to configure the lighting fixture for a plurality of different lighting applications, and wherein the housing portion comprises a plurality of cooling fins, at least one cooling fin of the plurality of cooling fins extending outwardly from the sidewall of the housing portion such that the at least one cooling fin is positioned between the housing portion and the modular lighting component.

10. The lighting fixture of claim 9, wherein the lighting fixture is a flood light.

11. The lighting fixture of claim 9, wherein the laser light facilitates aiming of the lighting fixture.

12. The lighting fixture of claim 9, wherein the laser assembly is configured to be activated based at least in part on a signal received via a wireless network.

13. The lighting fixture of claim 9, further comprising:
an accelerometer configured to provide a signal indicative of an aiming angle of the lighting fixture.

14. The lighting fixture of claim 13, wherein the lighting fixture is configured to communicate the signal indicative of the aiming angle over a wireless network.

15. The lighting fixture of claim 13, wherein the lighting fixture is configured to illuminate the plurality of LED devices based at least in part on the signal indicative of the aiming angle.

16. The lighting fixture of claim 15, wherein the lighting fixture is configured to illuminate the plurality of LED devices when the signal indicative of the aiming angle indicates that the lighting fixture is aimed at a preset aiming angle.

17. A lighting fixture, comprising:
a central housing portion;
a first lighting component mechanically coupled to the central housing portion at a first sidewall of the central housing portion, the first lighting component comprising a lighting assembly and a heat sink portion, the lighting assembly comprising a plurality of LED devices and a plurality of lenses, each lens secured relative to one of the plurality of LED devices;
a second lighting component mechanically coupled to the central housing portion at a second sidewall of the central housing portion, the second lighting component comprising a lighting assembly and a heat sink portion, the lighting assembly comprising a plurality of LED devices and a plurality of lenses, each lens secured relative to one of the plurality of LED devices;
wherein the first lighting component and the second lighting component are disposed relative to the central housing portion such that the first lighting component and the second lighting component mirror one another;
wherein at least one of the first lighting component and the second lighting component is removable relative to the central housing portion, and
wherein the central housing portion comprises a plurality of cooling fins, at least one of the plurality of cooling fins extending outwardly from the first sidewall of the housing portion such that the at least one cooling fin is positioned between the central housing portion and the first lighting component.

* * * * *